(12) United States Patent
Mikhailov

(10) Patent No.: US 8,550,905 B2
(45) Date of Patent: Oct. 8, 2013

(54) TEMPERATURE FEEDBACK MOTION CONTROLLER

(75) Inventor: Anton Mikhailov, Campbell, CA (US)

(73) Assignee: Sony Computer Entertainment Inc., Tokyo (JP)

(*) Notice: Subject to any disclaimer, the term of this patent is extended or adjusted under 35 U.S.C. 154(b) by 0 days.

(21) Appl. No.: 13/084,361

(22) Filed: Apr. 11, 2011

(65) Prior Publication Data

US 2012/0258800 A1 Oct. 11, 2012

(51) Int. Cl.
*A63F 9/24* (2006.01)

(52) U.S. Cl.
USPC .............. 463/30; 463/36; 463/37; 463/38; 463/47

(58) Field of Classification Search
USPC ........................... 463/47, 30, 36–38
See application file for complete search history.

(56) References Cited

U.S. PATENT DOCUMENTS

| | | | | |
|---|---|---|---|---|
| 2006/0238359 | A1* | 10/2006 | Cohen | 340/573.4 |
| 2009/0131165 | A1* | 5/2009 | Buchner et al. | 463/30 |
| 2009/0233710 | A1* | 9/2009 | Roberts | 463/30 |
| 2011/0275437 | A1* | 11/2011 | Jennings et al. | 463/38 |

OTHER PUBLICATIONS

Leung, Albert Y., Mark S. Wallace, Gery Schulteis, Tony L. Yaksh, "Qualitiative and quantitative characterization of the thermal grill", 2005, International Association for the Study of Pain.*
Lindstedt, Fredrik, Tina Lonsdorf, Martin Schalling, Eva Kosek, Martin Ingvar, "Perception of Thermal Pain and the Thermal Grill Illusion Is Associated with Polymorphisms in the Serotonin Transporter Gene", Mar. 2011, PLoS One.*

* cited by examiner

*Primary Examiner* — Werner Garner
(74) *Attorney, Agent, or Firm* — Martine Penilla Group, LLP

(57) ABSTRACT

Methods and systems for providing thermal feedback are presented. In one embodiment, a controller for interfacing with an interactive program includes an outer surface having a plurality of first surface regions and one or more second surface regions. The second surface regions are arranged in an alternating and adjacent fashion with the first surface regions. A heating source is coupled to the plurality of first surface regions, and a cooling source is coupled to the second surface regions. A thermal controller is provided for determining when to activate the heating source to heat the first surface regions and when to activate the cooling source to cool the second surface regions, based on thermal trigger data generated by the interactive program.

15 Claims, 21 Drawing Sheets

TEMPERATURE FEEDBACK MOTION CONTROLLER

RELATED APPLICATIONS

This application is related to U.S. patent application Ser. No. 12/623,352, entitled "CONTROLLER FOR INTERFACING WITH A COMPUTING PROGRAM USING POSITION, ORIENTATION, OR MOTION," filed Nov. 20, 2009, by inventors Xiadong Mao and Noam Rimon, and to U.S. patent application Ser. No. 12/963,594, entitled "BIOMETRIC INTERFACE FOR A HANDHELD DEVICE," filed Dec. 8, 2010, by inventor George Weising, the disclosures of which is herein incorporated by reference in its entirety.

BACKGROUND

1. Field of the Invention

The present invention relates to methods and systems for providing thermal feedback via a controller device interfacing with an interactive program.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation®, Sony Playstation2® (PS2), and Sony Playstation3® (PS3), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

It is in this context that embodiments of the invention arise.

SUMMARY

Embodiments of the present invention provide methods and systems for providing thermal feedback via a motion controller interfacing with an interactive program. It should be appreciated that the present invention can be implemented in numerous ways, such as a process, an apparatus, a system, a device or a method on a computer readable medium. Several inventive embodiments of the present invention are described below.

In one embodiment, a controller for interfacing with an interactive program includes an outer surface having a plurality of first surface regions and one or more second surface regions. The second surface regions are arranged in an alternating and adjacent fashion with the first surface regions. A heating source is coupled to the plurality of first surface regions, and a cooling source is coupled to the second surface regions. A thermal controller is provided for determining when to activate the heating source to heat the first surface regions and when to activate the cooling source to cool the second surface regions, based on thermal trigger data generated by the interactive program.

In one embodiment, the outer surface is defined on a handle portion of the controller to be contacted by the skin of a user when holding the controller. In one embodiment, simultaneous activation of the heating source and the cooling source produces a thermal grill illusion when the handle portion of the controller is held by a user. In one embodiment, the heating source and the cooling source comprise at least one thermoelectric device.

In one embodiment, the thermal controller determines a level of activation for the heating source and a level of activation for the cooling source based on the thermal trigger data generated by the interactive program.

In one embodiment, a controller for interfacing with an interactive program and providing thermal feedback from the interactive program is provided. The controller includes a first thermoelectric device having a first externally exposed surface that is heated when the first thermoelectric device is activated; a second thermoelectric device adjacent to the first thermoelectric device, the second thermoelectric device having a second externally exposed surface that is cooled when the second thermoelectric device is activated; and a third thermoelectric device adjacent to the second thermoelectric device, the third thermoelectric device having a third externally exposed surface that is heated when the third thermoelectric device is activated. The controller further includes a thermal controller for determining when to activate the first, second, and third thermoelectric devices based on thermal trigger data generated by the interactive program.

In one embodiment, the first, second, and third thermoelectric devices are defined in a handle portion of the controller, the handle portion oriented to be contacted by the skin of a user when holding the controller. In one embodiment, simultaneous activation of the first, second, and third thermoelectric devices produces a thermal grill illusion when the handle portion of the controller is held by a user.

In one embodiment, the controller includes a first insulator defined between the first thermoelectric device and the second thermoelectric device; and a second insulator defined between the second thermoelectric device and the third thermoelectric device.

In one embodiment, the controller includes a lamp for radiating colors correlated to the activation of the first, second, or third thermoelectric devices.

In one embodiment, a method for providing thermal feedback to a user operating a controller is provided. The method initiates with receiving thermal trigger data. A plurality of first surface regions of the controller are heated based on the thermal trigger data. One or more second surface regions of the controller are cooled based on the thermal trigger data, wherein the second surface regions are arranged in an alternating and adjacent fashion with the first surface regions.

In one embodiment, heating the plurality of first surface regions and cooling the one or more second surface regions includes activating at least one thermoelectric device.

In one embodiment, the method further includes tracking a position of the controller, and generating the thermal trigger data based on the tracked position of the controller.

In one embodiment, simultaneous heating of the first surface regions and cooling of the second surface regions produces a thermal grill illusion when the skin of the user contacts the first surface regions and the second surface regions.

In one embodiment, the method further includes illuminating a lighted portion of the controller, the illumination generating a color based on the thermal trigger data.

In one embodiment, a method for providing thermal feedback to a user operating a controller is provided. The method initiates with executing an interactive application. Thermal trigger data is then generated, the thermal trigger data determining a level of heating and cooling, respectively, for a plurality of alternating and adjacent surface regions of the controller. The thermal trigger data is then transmitted to the controller.

In one embodiment, generating the thermal trigger data includes determining a current location of a virtual object within a virtual environment, the current location being correlated to a predefined thermal feedback configuration.

In one embodiment, the method includes tracking a position of the controller, wherein the thermal trigger data is generated based on the tracked position of the controller.

In one embodiment, simultaneous heating and cooling, respectively, of the alternating and adjacent surface regions produces a thermal grill illusion when the skin of the user contacts the alternating and adjacent surface regions.

In one embodiment, the method further includes generating light trigger data based on the thermal trigger data, the light trigger data determining a color to be displayed by a light source of the controller. The light trigger data is transmitted to the controller.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIG. 11A-1 illustrates the sheath attachment of FIG. 11A disconnected from the controller.

DETAILED DESCRIPTION

The following embodiments describe methods and apparatus for interfacing with an interactive program.

It will be obvious, however, to one skilled in the art, that the present invention may be practiced without some or all of these specific details. In other instances, well known process operations have not been described in detail in order not to unnecessarily obscure the present invention.

Figure 1:
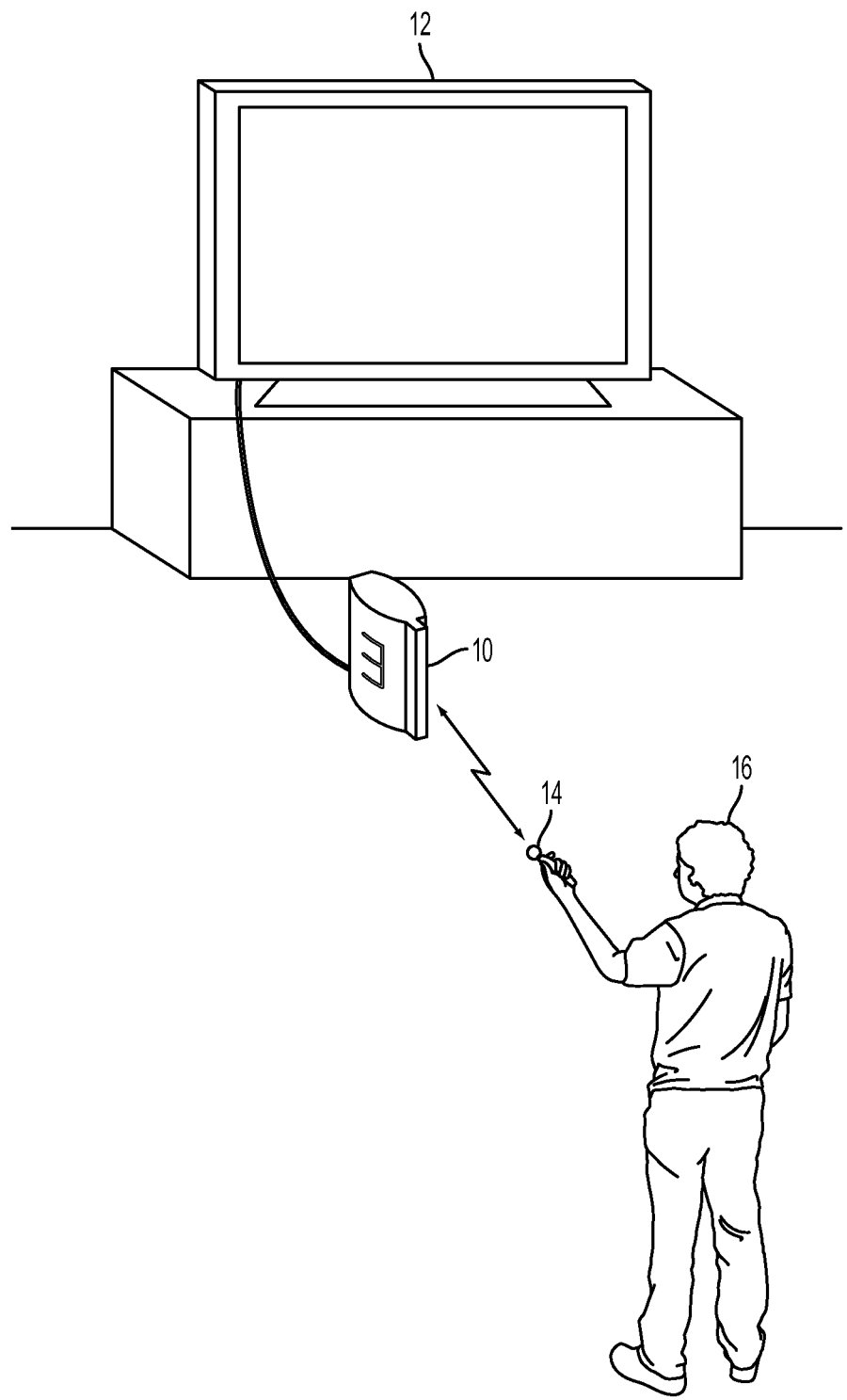
FIG. 1 illustrates a generic interactive system, in accordance with an embodiment of the invention.

FIG. 1 illustrates a generic interactive system, in accordance with an embodiment of the invention. The system includes a computer 10 and a display 12. In various embodiments, the computer 10 may be a general purpose computer, a special purpose computer, a gaming console, or other such device which executes an interactive program that is rendered on the display 12. Examples of gaming consoles as are known in the art include those manufactured by Sony Computer Entertainment, Inc. and other manufacturers. The display 12 may be a television, a monitor, a projector display, or other such displays and display systems which are capable of receiving and rendering video output from the computer 10. A user 16 provides input to the interactive program by operating a controller 14. In a preferred embodiment, the controller 14 communicates wirelessly with the computer 10, as this provides for greater freedom of movement of the controller than a wired connection. The controller 14 may include any of various features for providing input to the interactive program, such as buttons, a joystick, directional pad, trigger, touchpad, touchscreen, or other types of input mechanisms. One example of a controller is the Sony Dualshock 3 controller manufactured by Sony Computer Entertainment, Inc.

Furthermore, the controller 14 may be a motion controller that enables the user to interface with and provide input to the interactive program by moving the controller. One example of a motion controller is the Playstation Move controller, manufactured by Sony Computer Entertainment, Inc. Various technologies may be employed to detect the position and movement of a motion controller. For example, a motion controller may include various types of motion detection hardware, such as accelerometers, gyroscopes, and magnetometers. In some embodiments, a motion controller can include one or more cameras which captures images of a fixed reference object. The position and movement of the motion controller can then be determined through analysis of the images captured by the one or more cameras. In some embodiments, a motion controller may include an illuminated element which is tracked via a camera having a fixed position.

Figure 2:
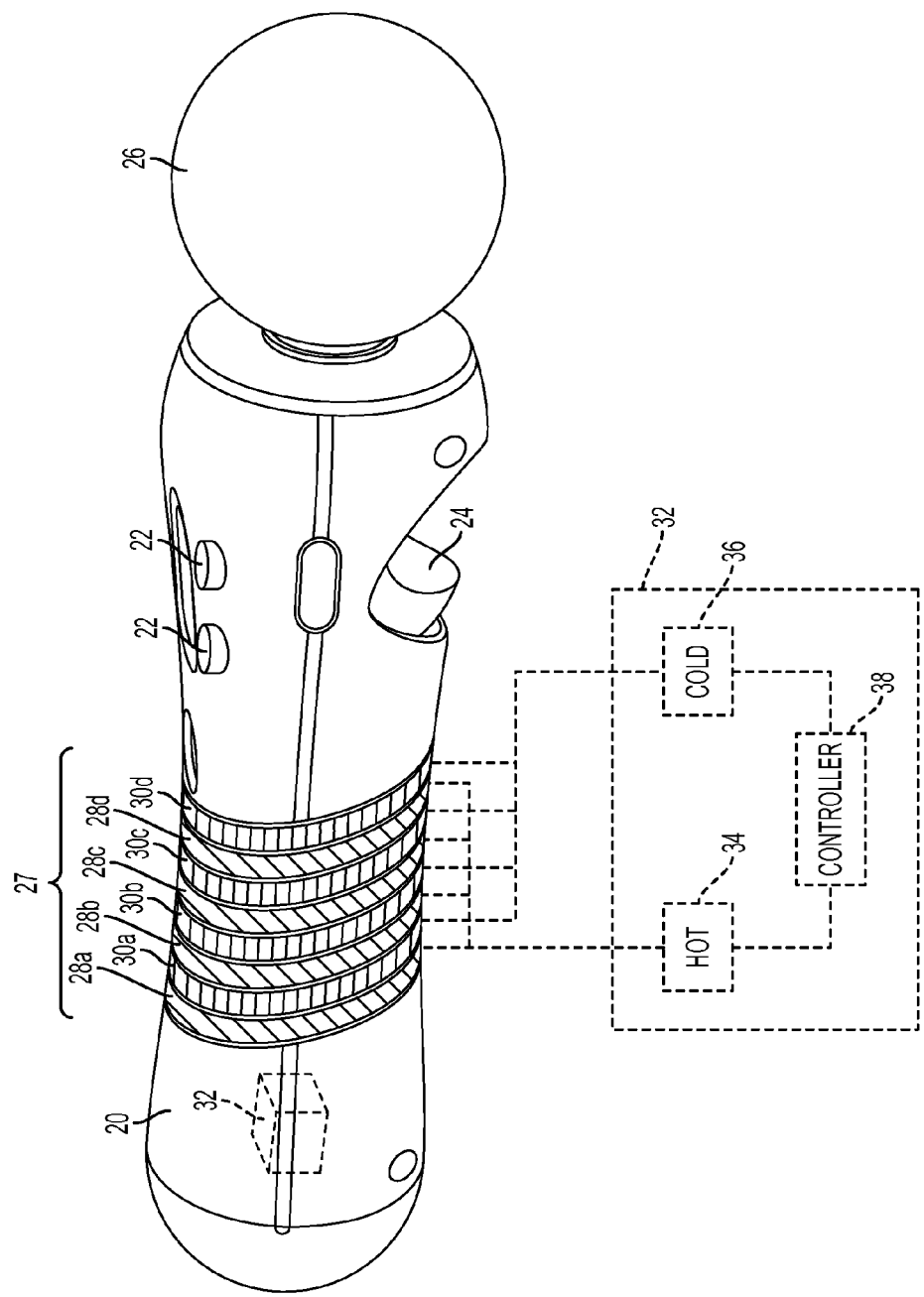
FIG. 2 illustrates a controller for interfacing with an interactive program, in accordance with an embodiment of the invention.

FIG. 2 illustrates a controller for interfacing with an interactive program, in accordance with an embodiment of the invention. The controller 20 includes various buttons 22 and a trigger 24 for providing input to the interactive program. The controller 20 also includes an attachment 26, which can be illuminated with various colors. The controller 20 includes a handle portion 27 for a user to grip, in which various regions are defined that may be heated or cooled. In the illustrated embodiment, regions 28a, 28b, 28c, and 28d are configured to be heated, and regions 30a, 30b, 30c, and 30d are configured to be cooled. As shown, the regions 28a, 28b, 28c, and 28d are arranged in an alternating and adjacent fashion with the regions 30a, 30b, 30c, and 30d, both configured to be contacted by the skin of a user when holding the controller.

The heating and cooling of the regions 28a-28d and 30a-30d is provided by a thermal module 32, included in the controller 20. The thermal module 32 includes a heat source 34 for heating the regions 28a, 28b, 28c, and 28d. The thermal module also includes a cooling source 36 for cooling the regions 30a, 30b, 30c, and 30d. The heat source 34 and cooling source 36 are controlled by a thermal controller 38. The thermal controller 38 determines when to activate the heat source 34 and cooling source 36 as well as the level of activation, thereby controlling the timing and the level of heating and cooling supplied to the regions 28a-28d and 30-30d, respectively.

It will be understood by those skilled in the art that the heating of regions 28a-28d and the cooling of regions 30a-30d may be operated and coordinated in a variety of manners. For example, the heating of each of regions 28a, 28b, 28c, and 28d may be coordinated so that they are heated simultaneously, or they may be heated in an individually controlled manner, so that the heating of one of the regions 28a-28d may differ from the heating of another of regions 28a-28d. In a similar manner, the cooling of each of regions 30a, 30b, 30c, and 30d may be effected in a simultaneous fashion or in an independent manner depending upon the desired effect to be achieved via the cooling of the regions.

For example, in order to provide a sensation of heat to a user holding the controller 20, the regions 28a-28d may be heated by the thermal module 32, while the regions 30a-30d are inactive. Likewise, in order to provide a sensation of cold to the user, the regions 30a-30d may be cooled by the thermal module 32, while the regions 28a-28d are inactive. It is also possible to generate a temperature gradient across the handle portion 27 of the controller 20 by selectively heating and cooling regions along the handle portion 27. For example, a temperature gradient can be achieved by heating region 28a to a high level, heating region 28b to a low level, cooling region 30c to a low level, and cooling region 30d to a high level.

Furthermore, in one embodiment, the regions 28a-28d are heated while the regions 30a-30d are simultaneously cooled. This can produce a thermal grill illusion when the user holds the controller 20 and simultaneously contacts both the heated and cooled regions. The thermal grill illusion can manifest as a painful or burning sensation to the user, even though the user is not actually contacting any surface that is hot or cold enough in and of itself to produce pain or cause tissue damage.

The foregoing examples of possible heating and cooling configurations are provided merely by way of example, as in other embodiments, the regions 28a-28d and 30a-30d may be heated and cooled in any manner or configuration, including various on/off states and levels, so as to achieve a desired temperature feedback effect. Furthermore, while the regions 28a-28d and regions 30a-30d have been described with reference to the illustrated embodiment, it will be apparent that the specific number of regions configured to be heated and the specific number of regions configured to be cooled may vary. To achieve the thermal grill illusion, the controller should have at least two regions configured to be heated and at least one region configured to the cooled. However, in other embodiments of the invention, the controller may have any number of regions configured to be heated and any number of regions configured to be cooled, the heated and cooled regions arranged in an alternating and adjacent fashion.

Additionally, the attachment 26 may be lighted in a manner that corresponds to the heating or cooling applied to the various regions. For example, in one embodiment, the attachment is illuminated to display a blue color when only the regions 30a-30d are cooled, a yellow/orange color when only the regions 28a-28d are heated, and a red color when both the regions 28a-28d and 30a-30d are heated and cooled, respectively. In this manner, the color displayed by the attachment 26 moves from the blue end of the spectrum when the controller 20 is cold, to a yellow/orange spectrum when the controller 20 is warm, to the red end of the spectrum when the controller 20 is delivering a thermal grill illusions. Furthermore, the transition from one color to another may be continuous and be correlated to changes in the heating and cooling configuration of the regions. The foregoing represents merely one example of coordination of lighting of the attachment 26 with the thermal feedback provided via the regions 28a-28d and 30a-30d. In other embodiments, the specific colors displayed by the attachment 26 may be correlated to various thermal configurations of the regions 28a-28d and 30a-30d in any manner, to provide a visual indication of the thermal feedback being provided by the controller 20.

Figure 3:
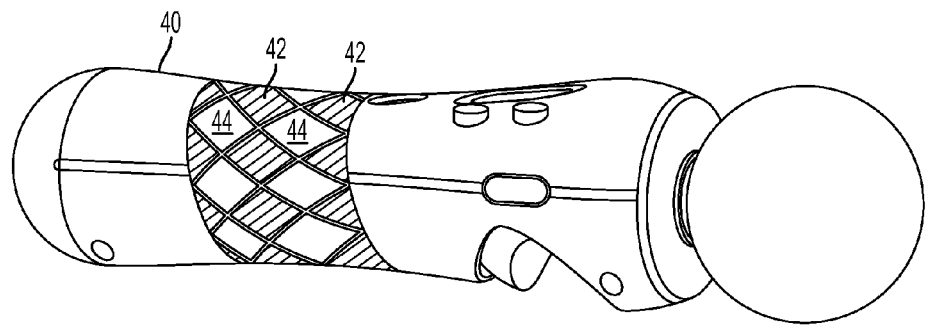
FIG. 3 illustrates a controller having regions which are configured to be heated and regions which are configured to cooled, in accordance with an embodiment of the invention.

Furthermore, the regions configured to be heated and the regions configured to be cooled may be arranged in any number of ways, provided that heated regions and cooled regions are alternating and adjacent to each other. By way of example, FIG. 3 illustrates a controller 40 having regions 42 which are configured to be heated and regions 44 which are configured to cooled. The regions 42 and regions 44 are arranged in a checkerboard-type pattern disposed over a handle portion of the controller 40.

Figure 4:
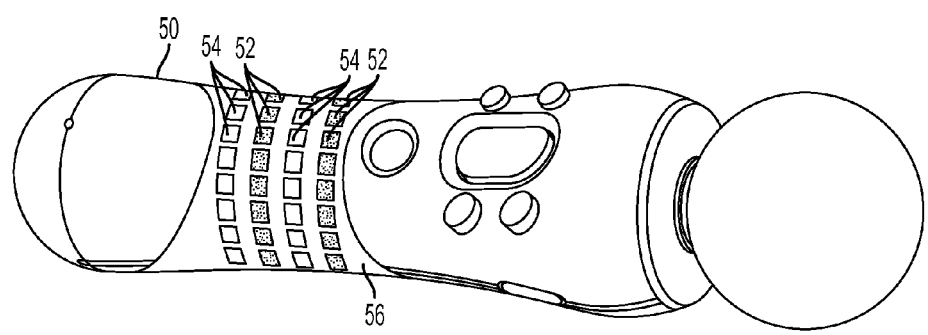
FIG. 4 illustrates a controller having regions which are configured to be heated and regions which are configured to be cooled, in accordance with an embodiment of the invention.

In another example, FIG. 4 illustrates a controller 50 having regions 52 which are configured to be heated and regions 54 which are configured to be cooled. As shown in the illustrated embodiment, the regions constitute individual geometrically shaped (e.g. square-shaped) portions distributed over a handle portion of the controller 50. Each of the heated regions 52 is adjacent to and alternates with at least one of the cooled regions 54. Each of the regions is defined in an insulator 56 which insulates the heated regions 52 from the cooled regions 54 to enable each to be heated or cooled efficiently without interfering with each other.

The insulator 56 may be composed of any material which provides suitable thermal insulation between and/or around the heated regions 52 and the cooled regions 54. Additionally, in preferred embodiments, the insulator 56 is suitably compliant to cope with thermal expansion and contraction of the heated and cooled regions, and durable over repeated thermal cycling. Furthermore, the insulator 56 may be configured to provide friction against the skin of a user to enable a solid grip. This may be important when the heated and cooled regions are smooth or slippery surfaces which do not provide for a solid grip. The insulator 56 may be textured, including features such as dimpling or knobs, to promote gripping. The insulator 56 may include various materials such as hard and soft plastics, rubberized plastics, polymers, rubbers, and other materials. The materials can also be contoured to provide conformance with a human hand.

In some embodiments, the insulator 56 is configured to be illuminated. The insulator 56 may be composed of a transparent or translucent material, which is illuminated by a light source. As described elsewhere, the color or intensity of illumination may be correlated to a degree or level of the thermal feedback provided via the heated and cooled regions 52 and 54. The degree or level can be shown by having the insulator 56 change color shades incrementally or progressively during a period of time or during a gaming session.

Figure 5:
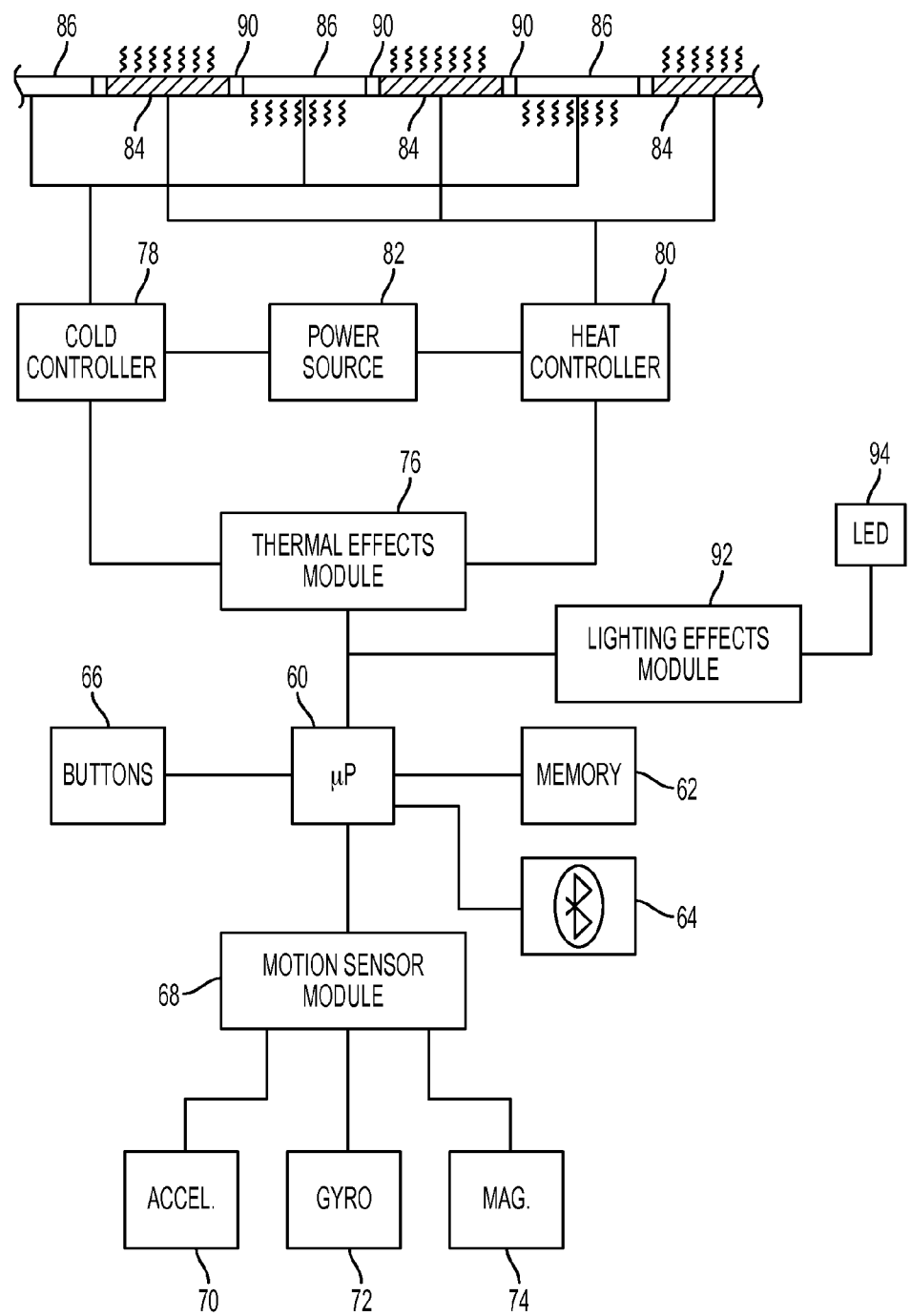
FIG. 5 illustrates components of a motion controller, in accordance with an embodiment of the invention.

FIG. 5 illustrates components of a motion controller, in accordance with an embodiment of the invention. The controller includes a processor 60 and a memory 62 for storing and executing program instructions. The controller communicates wirelessly with a computer or console executing an interactive program via a wireless communications module 64. In one embodiment, the wireless communication utilizes the Bluetooth communication protocol, though in other embodiments, other wireless communications technology may be utilized. The controller includes various mechanisms for receiving input such as buttons 66. Also, the controller includes a motion sensor module 68 which detects inputs from an accelerometer 70, gyroscope 72, and magnetometer 74. These input mechanisms allow a user to provide input by maneuvering the controller.

A thermal effects module 76 is provided for managing thermal feedback provided by the controller. As the user interacts with the interactive program (e.g. providing input to the interactive program by operating the buttons 66 or moving the controller), the interactive program determines a type and level of thermal feedback to provide to the user. This information is communicated wirelessly to the controller. The thermal effects module 76 is in communication with the processor 60, and receives instructions regarding the type and level of thermal feedback to be provided by the controller. The thermal effects module 76 directs the operation of cold controller 78 or heat controller 80 based on the received instructions.

The cold controller 78 interfaces between a power source 82 and one or more thermoelectric devices 86. A thermoelectric device is a device which converts an electric potential to a temperature difference. This effect is known as the Peltier effect. One example of a thermoelectric device is a Peltier cooler or Peltier element which, when activated, evolves heat on one side, and withdraws heat from the opposite side (thereby cooling the opposite side). Further explanation and examples of thermoelectric devices and materials may be found with reference to "*A comprehensive review of thermoelectric technology, micro-electrical and power generation properties*," Gould et al., Proceedings of the 26$^{th}$ International Conference on Microelectronics, 11-14 May 2008, p329-332, the disclosure of which is incorporated by reference herein for all purposes.

The thermoelectric devices 86 are arranged at the surface of the controller such that when activated, the externally facing portions of the thermoelectric devices 86 are cooled. Consequently, the internally-facing portions of the thermoelectric devices 86 are simultaneously heated. Thus, in response to signals from the thermal effects module 76, the cold controller 78 may activate the thermoelectric devices 86 by engaging power source 82 to power the thermoelectric devices 86, or may adjust the level of activation, or deactivate the thermoelectric devices 86. In a similar manner, a heat controller 80 interfaces between the power source 82 and thermoelectric devices 84, which are arranged on the surface of the controller to have externally facing surfaces that are heated when the thermoelectric devices 84 are activated. Consequently, the internally-facing surfaces of the thermoelectric devices 84 are simultaneously cooled. The heat controller 80 activates, modulates, or deactivates the thermoelectric devices 84 in response to signals received from the thermal effects module 76.

The thermoelectric devices 84 and 86 are separated by insulators 90. The insulators 90 prevent the transfer of heat between the thermoelectric devices 84 and the thermoelectric devices 86, to enable them to be efficiently heated and cooled without interfering with each other. The insulators 90 may be composed of any material capable of preventing significant heat transfer between adjacent thermoelectric devices. Preferred materials will also exhibit suitable durability and resilience to repeated thermal cycling over the lifetime of the controller.

The controller further includes a lighting effects module 92 which controls the lighting of one or more LED's 94, which may be used to light an attachment such as attachment 26 of FIG. 2. The interactive program determines a color to be displayed by the controller, and transmits instructions to the controller. The lighting effects module 92 receives instructions to generate the determined color and causes the LED's 94 to generate the color. The particular color generated may be synchronized to the particular activation configuration of the thermoelectric devices 84 and 86.

Figure 6:
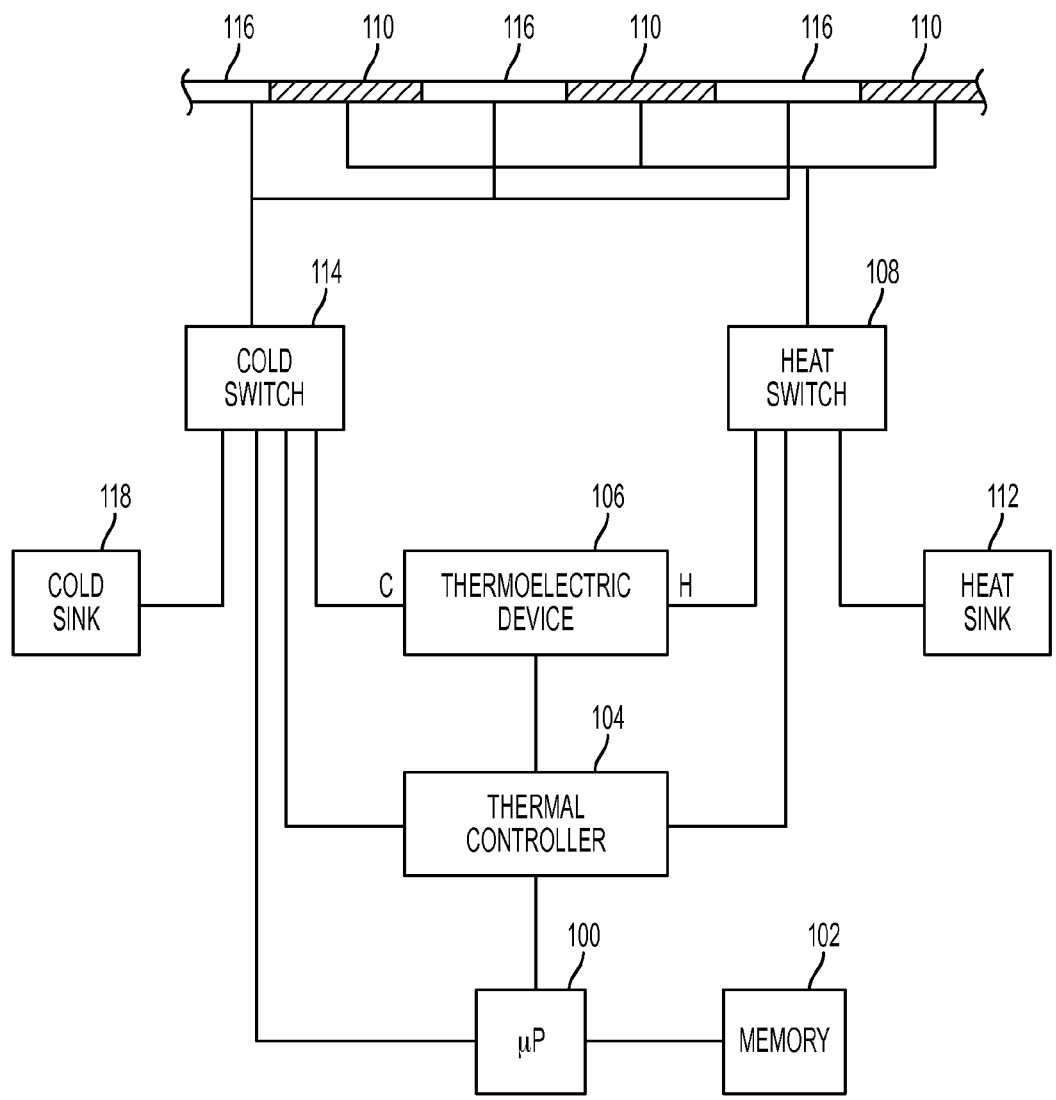
FIG. 6 is a schematic diagram illustrating components of a controller for providing thermal feedback from an interactive program, in accordance with an embodiment of the invention.

FIG. 6 is a schematic diagram illustrating components of a controller for providing thermal feedback from an interactive program, in accordance with an embodiment of the invention. The controller includes a processor 100 and memory 102 for storing and executing program instructions. The controller further includes a thermal controller 104 for controlling the operation of a thermoelectric device 106, a heat switch 108, and a cold switch 114, in response to instructions to generate a particular configuration of temperatures at the surface of the controller. Though one of each of a thermoelectric device, a heat switch, and a cold switch are shown in the illustrated embodiment for convenience, it will be appreciated that in various embodiments there may be more than one thermoelectric device, heat switch, or cold switch.

When activated by the thermal controller 104, the thermoelectric device 106 generates heat on one side and cold on an opposite side (by withdrawing heat from the opposite side). The heat side of the thermoelectric device 108 is connected to a heat switch 108. The heat switch 108 is controlled by the thermal controller 104, and directs the heat generated by the thermoelectric device 108 to either of surface regions 110 or heat sink 112. Heat sink 112 is any device which absorbs or distributes heat away from the surface of the controller. The cold side of the thermoelectric device 106 is connected to a cold switch 114, which directs the cold to either of regions 116 or a cold sink 118, as determined by the thermal controller 104. A cold sink is any device which absorbs or distributes the cold away from the surface of the controller. In some embodiments, the cold sink 118 may be a processor such as 100 or other onboard device which generates heat. The regions 110 constitute surface regions of the controller which are configured to be heated, whereas the regions 116 constitute surface regions that are configured to be cooled.

The illustrated embodiment provides a flexible configuration for providing various temperature feedback sensations to the user. For example, a warm/hot sensation may be provided by only heating the surface regions 110. To achieve this, the thermoelectric device 106 is activated, and the heat switch 108 is controlled to direct heat to the regions 110, while the cold switch 114 is controlled to direct cold generated by the thermoelectric device 106 to the cold sink 118. Or a cold sensation may be provided by only cooling the surface regions 116. This can be achieved by activating the thermoelectric device 106, and controlling the cold switch 114 to direct the cold to the regions 116, while controlling the heat switch 108 to direct the heat generated by the thermoelectric device 106 to the heat sink 112. A thermal grill illusion may be achieved by activating the thermoelectric device, and controlling the heat switch to direct heat to the regions 110, and controlling the cold switch 114 to direct cold to the regions 116.

In an alternative embodiment, the regions 110 and 116 may be configured to both heated and cooled. This may be accomplished by, for example, having each of the regions 110 and 116 be connected to both of at least one cold switch and at least one heat switch. In one embodiment of such a configuration, each of the regions 110 and 116 may be individually controlled to be independently heated or cooled. By having independent control of the regions' temperatures, in such a configuration, it is possible to achieve very precise temperature gradients, thermal grill illusions, and other types of temperature configurations across the different regions 110 and 116.

Figure 7:
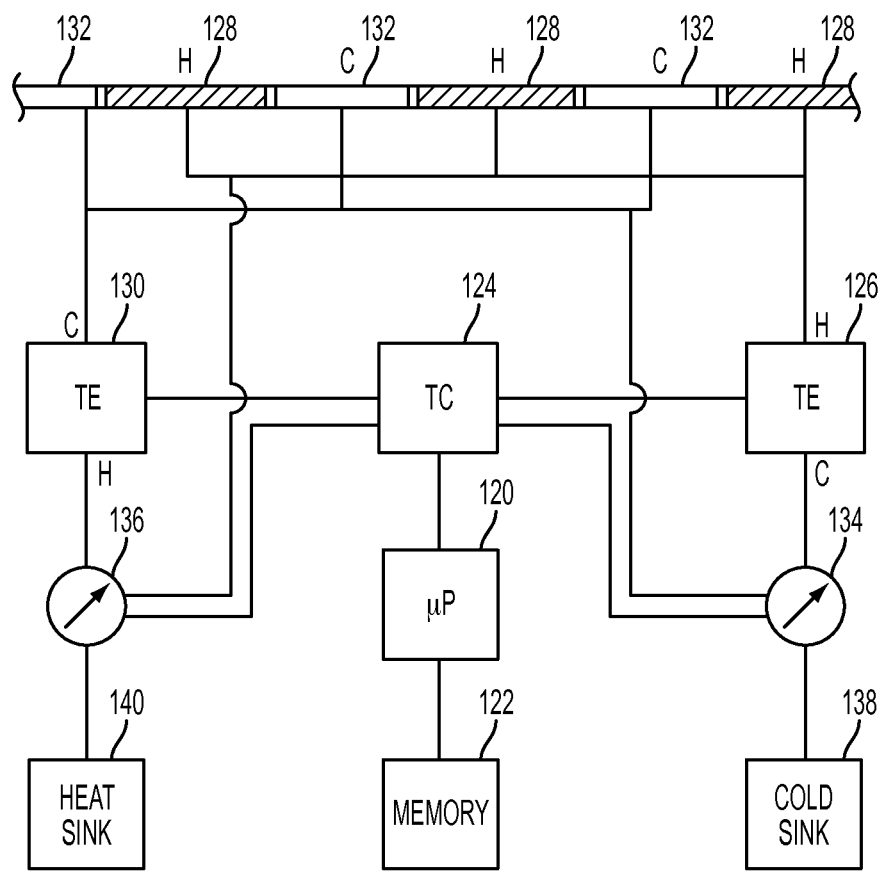
FIG. 7 is a schematic diagram illustrating components of a controller for providing thermal feedback from an interactive program, in accordance with an embodiment of the invention.

FIG. 7 is a schematic diagram illustrating components of a controller for providing thermal feedback from an interactive program, in accordance with an embodiment of the invention. The controller includes a processor 120 and memory 120 for storing and executing program instructions. The thermal controller 124 controls the operation of thermoelectric devices 126 and 130, as well as thermal switches 134 and 136. When the thermoelectric device 126 is activated, it generates heat on one side to heat the surface regions 128, and cold on an opposite side that is directed via thermal switch 134 to either of regions 132 or cold sink 138. Similarly, when the thermoelectric device 130 is activated, it generates cold on one side to cool the surface regions 132, and heat on the other side that is directed via thermal switch 136 to either of regions 128 or heat sink 140.

It will be apparent that the present embodiment provides for a variety of possible heating and cooling configurations for the surface regions 128 and 132, as cold generated by thermoelectric device 126 can augment that of thermoelectric device 130, and heat generated by thermoelectric device 130 can augment that of thermoelectric device 126. For example, it is possible to only heat the regions 128 by activating thermoelectric device 126 to heat the regions 128 and controlling the thermal switch 134 to direct the cold generated by thermoelectric device 126 to the cold sink 138. Similarly, it is possible to only cool the regions 132 by activating thermoelectric device 130 to cool the regions 132 and controlling thermal switch 136 to direct the heat generated by thermoelectric device 130 to heat sink 140. It is also possible to heat regions 128 and cool regions 132 by combining the foregoing operations, thereby providing a thermal grill effect to the user.

Also, it is possible to maximally heat and cool regions 128 and 132, respectively, by controlling thermal switch 134 to direct cold generated by the thermoelectric device 126 to the regions 132, and controlling thermal switch 136 to direct heat generated by the thermoelectric device 130 to the regions 128. In this manner, the cold and heat generated by thermoelectric devices 134 and 136, respectively, is used to augment that generated by the other for the purposes of heating and cooling the regions 128 and 130, respectively. It will be apparent that regions 128 may be heated maximally, while regions 132 are cooled to a moderate level, by activating both thermoelectric devices 126 and 130 while operating thermal switch 134 to direct cold to cold sink 138 and operating thermal switch 136 to direct heat to regions 128. Likewise, regions 132 may be cooled maximally, while regions 128 are heated to a moderate level, by activating both thermoelectric devices 126 and 130 while operating thermal switch 134 to direct cold to regions 132 and operating thermal switch 136 to direct heat to heat sink 140.

Figure 8:
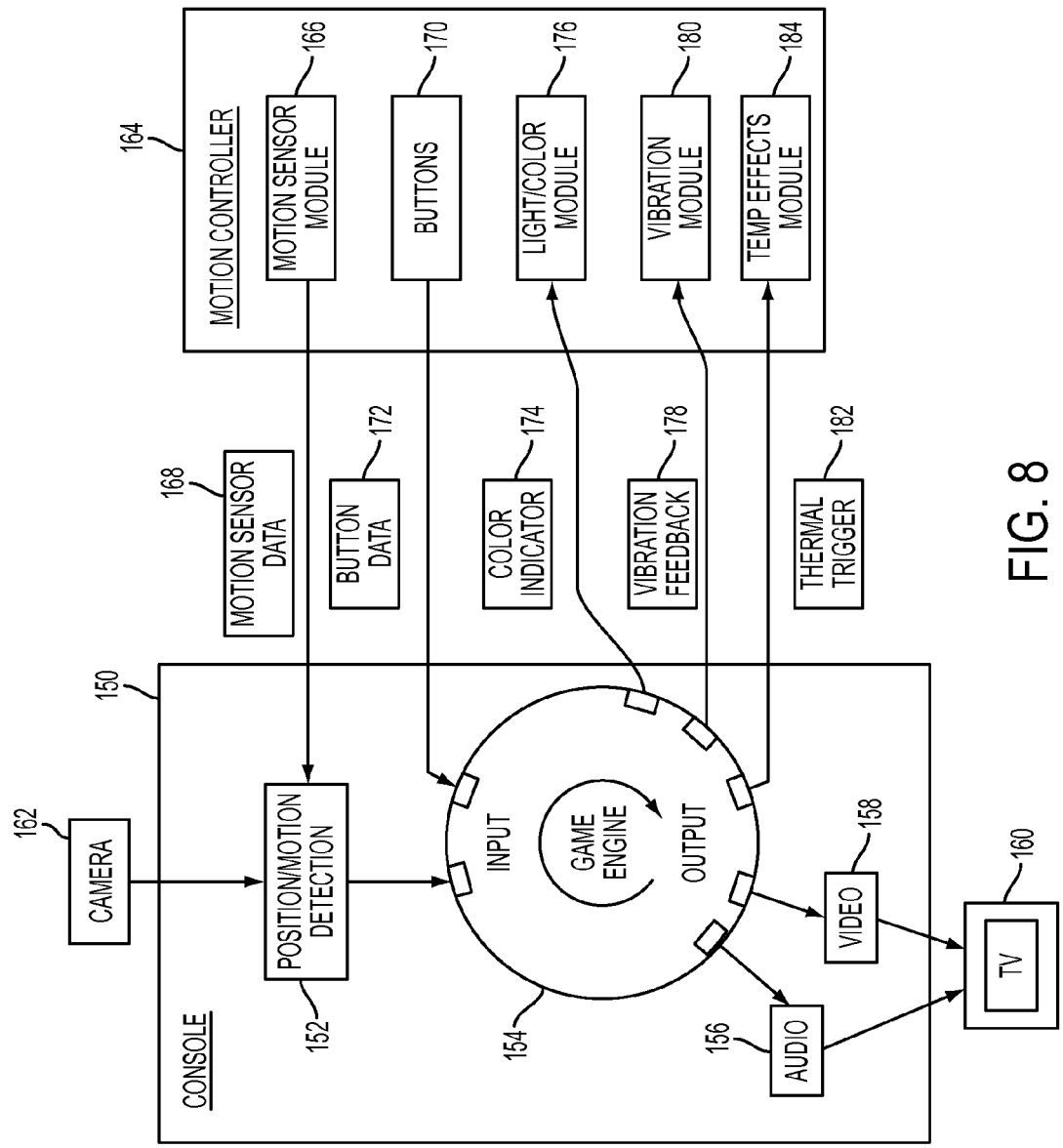
FIG. 8 illustrates a system for providing thermal feedback to a motion controller, in accordance with an embodiment of the invention.

FIG. 8 illustrates a system for providing thermal feedback to a motion controller, in accordance with an embodiment of the invention. The system includes a console 150, a display 160, a camera 162, and a motion controller 164. The console 150 executes an interactive application 154, which receives various inputs, and outputs various types of feedback data. The interactive application 154 also outputs audio data 156 and video data 158 for rendering on the display 160. In one embodiment the interactive application 154 may be a video game, though in other embodiments, the interactive application 154 may be any other type of program or application with which a user may interact.

The motion controller 164 includes a motion sensor module 166 which detects data from various motion sensing hardware, such as an accelerometer, gyroscope, or magnetometer, and transmits corresponding motion sensor data 168 to a motion detection module 152 of the console 150. Additionally, the motion detection module 152 receives data from a camera 162, which captures an image stream of the motion controller. The motion detection module 152 analyzes the captured image stream and the motion sensor data 168 to determine the position, orientation, and motion of the motion controller 164. This data is provided as input to the interactive application 154. The motion controller also includes buttons 170. When buttons 170 are activated, the controller 164 generates corresponding button data 172 and transmits the button data 172 as input for the interactive application 154.

As the interactive application 154 executes, it generates various types of feedback data. For example, the interactive application generates color indicator data 174 which indicates a color to be displayed by the motion controller 164. The color indicator data 174 is transmitted to a light/color module 176 of the motion controller 164. The light/color module 176 activates and controls a light source, such as one or more colored LEDs, based on the color indicator data 174, to display the desired color. In one embodiment, the color is displayed by illuminating an attachment or portion of the motion controller 164. The interactive application 154 also generates vibration feedback data 178 which indicates parameters for vibration feedback to be provided by the motion controller 164. The vibration feedback data 178 is transmitted to a vibration module 180 of the motion controller 164, which operates a mechanism for producing the desired vibration feedback at the motion controller 164.

Additionally, the interactive application 154 generates thermal trigger data 182, which indicates parameters for providing thermal feedback to the user via the motion controller 164. The thermal trigger data 182 is transmitted to a temperature effects module 184, which activates and controls various thermal hardware to produce the desired temperature feedback effect. As described elsewhere herein, the thermal feedback effect may include various states of heating, cooling, and thermal grill illusion effects, among others. It will be appreciated that the various types of feedback, including lighting/color feedback, vibration feedback, and temperature feedback, may be synchronized with each other in various combinations to convey a multifaceted visual and visceral feedback experience to the user.

Figure 9:
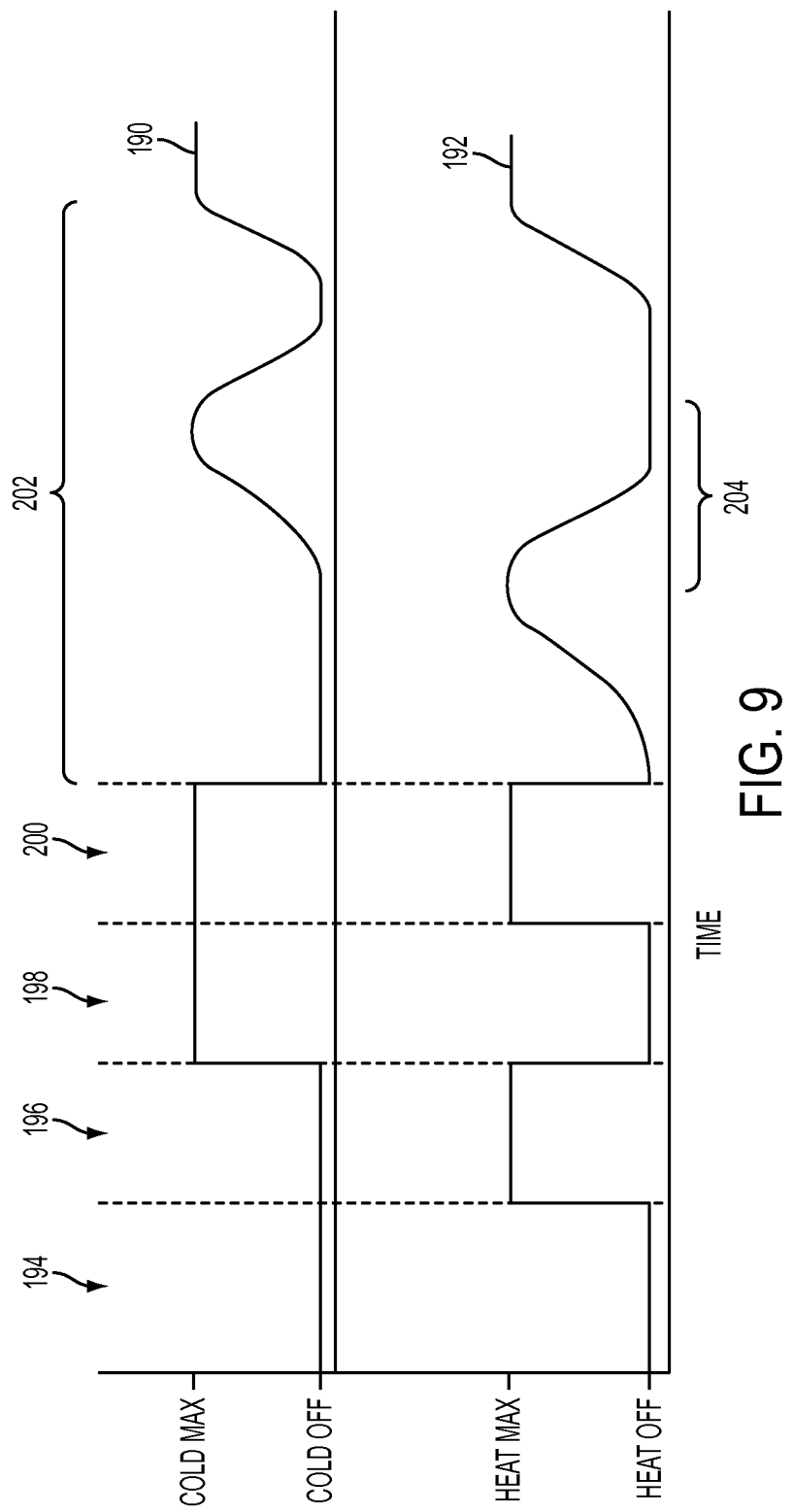
FIG. 9 is a graph illustrating levels of activation over time for surfaces of a controller configured to be heated or cooled, in accordance with an embodiment of the invention.

FIG. 9 is a graph illustrating levels of activation over time for surfaces of a controller configured to be heated or cooled, in accordance with an embodiment of the invention. The curve 190 illustrates the level of activation for a surface configured to be cooled, and the curve 192 illustrates the level of activation for a surface configured to be heated. It will be apparent to those skilled in the art that the level of activation for the surfaces may vary over time. For example, during a time 194, neither surface is activated. At a time 196, only the heated surface is activated to a maximum level to provide maximum heat feedback. Whereas at time 198, only the cooled surface is activated to a maximum level to provide maximum cold feedback. At time 200, both the cooled and the heated surfaces are activated to their maximum levels, thereby providing a thermal grill illusion when the surfaces are configured to be alternating and adjacent to each other, as described above.

At times 194, 196, 198, and 200, the surfaces are activated in essentially an on or off binary manner. However, the level of activation may vary continuously, or over any number of levels in accordance with various embodiments of the invention. By way of example, during time 202 the level of activation of both the cooled and heated surfaces varies continuously over time. At specific time 204, the heated surface is decreasing from maximum activation to zero activation, while the cooled surface is simultaneously increasing from zero activation to maximum activation. It will be apparent that the heated and cooled surfaces may be simultaneously activated to any level of activation, including zero, intermediate, and maximum activation levels, in any number of combinations to provide a variety of thermal feedback sensory experiences to the user.

Figure 10:
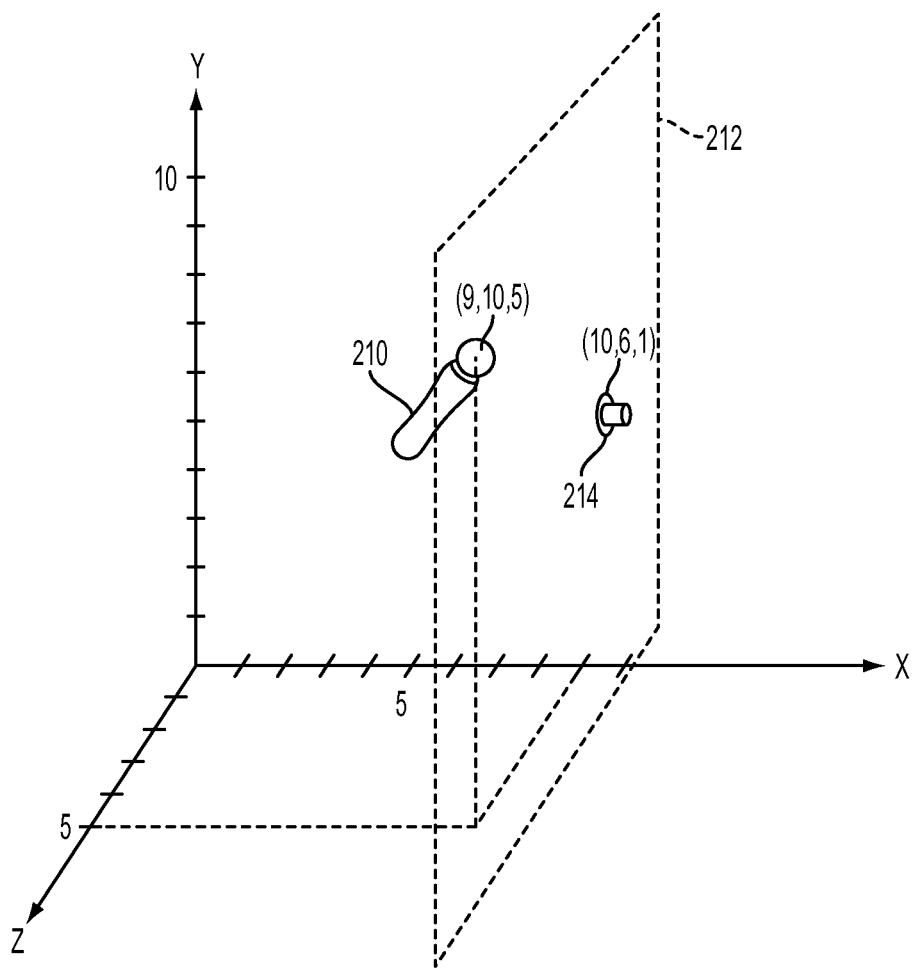
FIG. 10 illustrates a controller in a three-dimensional coordinate space, in accordance with an embodiment of the invention.

FIG. 10 illustrates a controller in a three-dimensional coordinate space, in accordance with an embodiment of the invention. As shown, the controller 210 exists in an (x, y, z) three-dimensional real-world coordinate space. The position and motion of the controller is tracked in accordance with methods and apparatus as described herein. The controller 210 has a current position of (9, 10, 5). In embodiments of the invention, the real-world coordinate space may be mapped to a three-dimensional virtual space, so that movements of the controller in the real-world coordinate space correlate to movements in the virtual space. The virtual space may be configured such that movement to certain positions or near certain objects within the virtual space will cause thermal feedback to be rendered by the controller 210.

For example, in a virtual space correlated to the real-world space as shown, there may be a door 212 with a door knob 214. The position of the door knob in the virtual space might be correlated to a position in the real-world coordinate space at (10, 6, 1). Thus, when the controller 210 is moved to the correlated position of the door knob, the controller 210 may render thermal feedback to the user, indicating that the door knob is of a certain temperature. For example, if there is a fire behind the door in the virtual space, then the controller might be heated to provide thermal feedback indicating to the user that the door knob is hot, such as by heating surfaces of the controller or providing a thermal grill illusion effect.

Figure 11A:
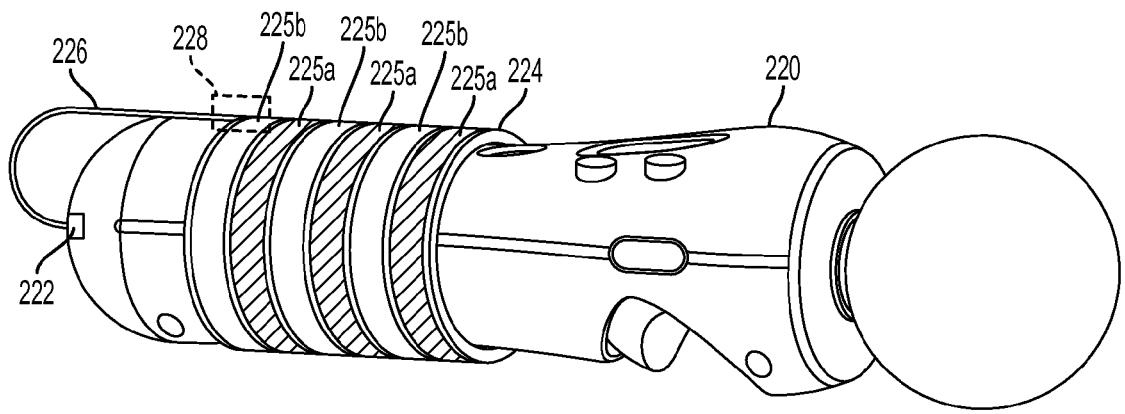
FIG. 11A illustrates a sheath attachment and controller for providing thermal feedback, in accordance with an embodiment of the invention.
Figures 1, 11A:
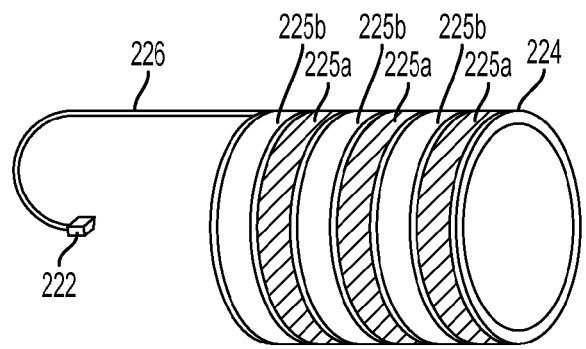

FIG. 11A illustrates a sheath attachment for providing thermal feedback, in accordance with an embodiment of the invention. As shown, a controller 220 includes a data port 222. A sheath attachment 224 is attached to the controller 220 around a handle portion of the controller 220, and connects to the data port 222 via cable 226. The sheath attachment is configured to provide thermal feedback mechanisms, such as by heating surface regions 225a or cooling surface regions 225b, separately or in combination. FIG. 11A-1 illustrates the sheath attachment 224 disconnected from the controller 220. It will be noted that the sheath attachment 224 can be an accessory to the controller 220, configured to be detachable from the controller 220.

Figure 11B:
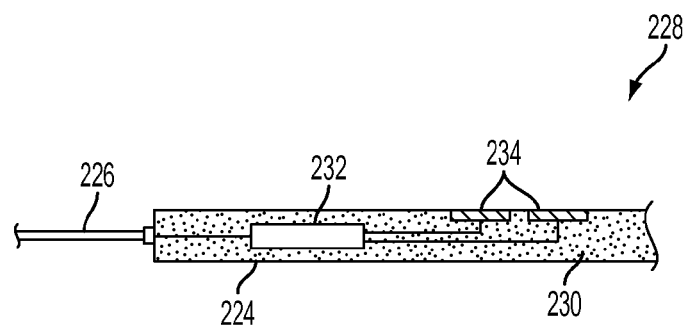
FIG. 11B illustrates a cross-section view of a portion of the sheath attachment of FIG. 11A, in accordance with an embodiment of the invention.

FIG. 11B illustrates a cross-section view of a portion 228 of the sheath attachment 224 of FIG. 11A, in accordance with an embodiment of the invention. The sheath attachment 224 includes an insulating material 230 which thermally insulates thermoelectric devices 234 from each other. The thermoelectric devices are activated to heat or cool the regions 225a and 225b, respectively. A controller 232 is operatively connected to the dataport 22 of the controller 220, and controls the operation of the thermoelectric devices 234. The sheath attachment 224 receives control data and power via the dataport 222 to control and power the thermoelectric devices 234.

Figure 12A:
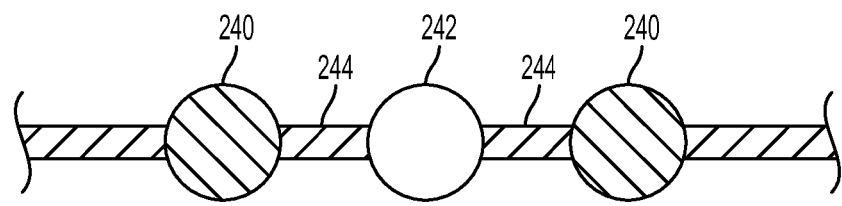
FIG. 12A illustrates a cross-section of a portion of a controller for providing thermal feedback, in accordance with an embodiment of the invention.

FIG. 12A illustrates a cross-section of a portion of a controller for providing thermal feedback, in accordance with an embodiment of the invention. Conductors 240 and 242 are configured to be heated and cooled, respectively. The externally exposed portions of the conductors 240 and 242 define surface regions which provide thermal feedback when contacted by the skin of a user holding the controller. The conductors 240 and 242 are separated by thermal insulators 244 to promote efficient heating and cooling of the individual conductors 240 and 242. The conductors 240 and 242 may be composed of any material which efficiently transfers heat, including various metals such as aluminum. The thermal insulators 244 may be composed of any material which effectively prevents heat transfer between the conductors 240 and 242, including various polymers. The thermal insulators 244 may also be reasonably compliant in order to withstand thermal expansion and compression of the conductors 240 and 242.

Figure 12B:
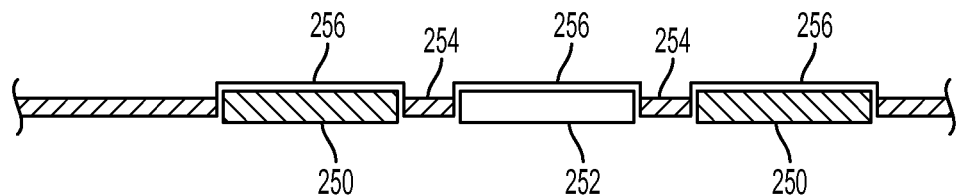
FIG. 12B illustrates a cross-section of a portion of a controller for providing thermal feedback, in accordance with an embodiment of the invention.

FIG. 12B illustrates a cross-section of a portion of a controller for providing thermal feedback, in accordance with an embodiment of the invention. Thermoelectric devices 250 and 252 are configured to provide heating or cooling, respectively, of surface regions 256. The thermoelectric devices 250 and 252 are separated by thermal insulators 254.

Figure 12C:
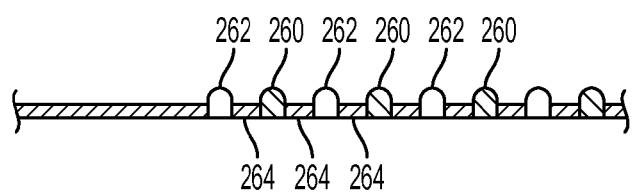
FIG. 12C illustrates a cross-section of a portion of a controller for providing thermal feedback, in accordance with an embodiment of the invention.

FIG. 12C illustrates a cross-section of a portion of a controller for providing thermal feedback, in accordance with an embodiment of the invention. Conductors 260 and 262 are configured to be heated and cooled, respectively, and are separated by thermal insulators 264. It will be apparent to those skilled in the art that the shape and dimensions of the conductors and the thermal insulators may vary to a large extent. By way of comparison, the conductors 260 and 262 of FIG. 12C are significantly smaller than the conductors 240 and 242 of FIG. 12A. In various other embodiments, the conductors may have any size or shape sufficient to provide thermal feedback to the user.

Figure 13:
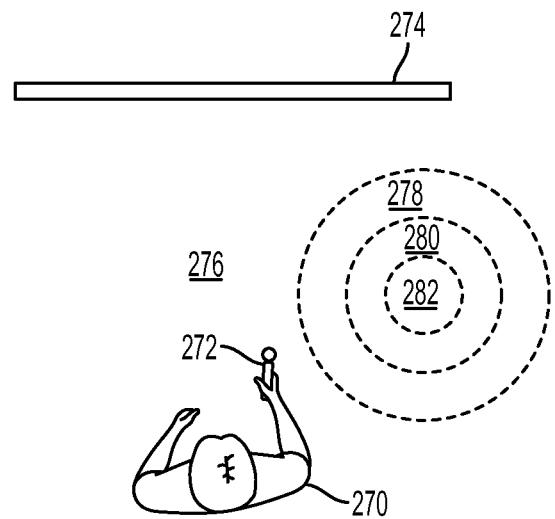
FIG. 13 illustrates an overhead view of a user operating a motion controller, in accordance with an embodiment of the invention.

FIG. 13 illustrates an overhead view of a user operating a motion controller, in accordance with an embodiment of the invention. The user 270 views an interactive application rendered on a display 274. The user provides input and interacts with the interactive application by operating and maneuvering the motion controller 272. In one embodiment, the interactive program may be configured such that placement of the motion controller in a certain region of space results in a specific type of thermal feedback being activated at the motion controller 272. By way of example, in the illustrated embodiment, operation of the controller in the region 276 does not produce any thermal feedback. Whereas movement of the controller 272 to regions 278, 280, and 282 produce increasing levels of hot or cold thermal feedback. In one embodiment, movement of the controller 272 to region 282 results in activation of a thermal grill illusion on the controller 272. The regions may be correlated with objects or entities in a virtual space.

For example, in one embodiment the region 282 is correlated with an object that the user 270 is unable to view in the rendered interactive application on the display 274. The user 270 can discover the location of the object by moving the controller 272, and receiving thermal feedback indicating the location of the object. For example, as the user moves the controller 272 through regions 278 and 280, the interactive application directs the controller 272 to provide increasing levels of heating or cooling, reaching a maximum level of heating or cooling when the controller is placed in the region 282. In one example, the interactive application is a video game and the object is a ghost that the user must find. As the controller is placed into regions 278, 280, and 282, the controller becomes increasingly cold, indicating the presence of the ghost.

Figure 14:
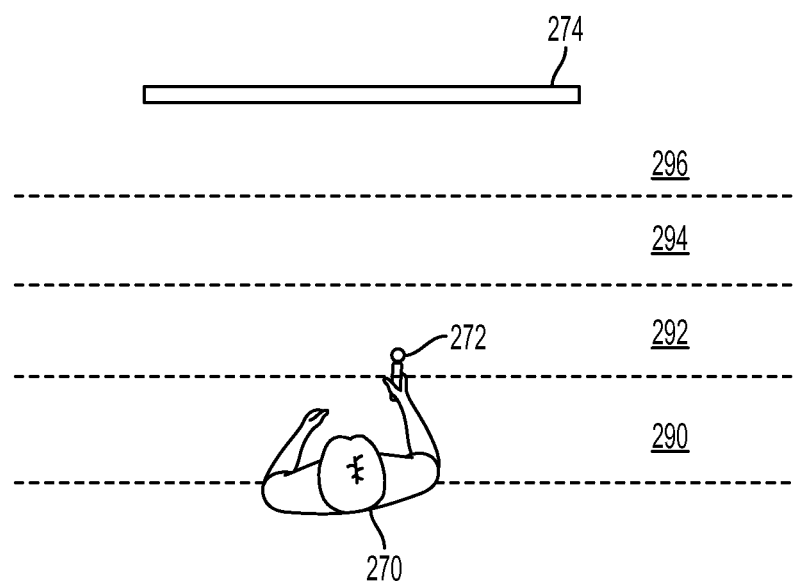
FIG. 14 illustrates an overhead view of an interactive environment for providing thermal feedback, in accordance with an embodiment of the invention.

FIG. 14 illustrates an overhead view of an interactive environment for providing thermal feedback, in accordance with an embodiment of the invention. The user 270 interacts with an interactive application rendered on the display 274, providing input by operating motion controller 272. Regions 290, 292, 294, and 296 are defined such that positioning the controller 272 within one of the regions causes thermal feedback to be provided on surface regions of the controller 272. For example, as the user 270 maneuvers controller 272 forward through regions 290, 292, 294, and 296, the controller 272 may provide increasing levels of heating or cooling as thermal feedback to the user 270. Or one or more of the regions 290, 292, 294, or 296 might be configured to provide a thermal grill illusion at the controller 272.

Figure 15:
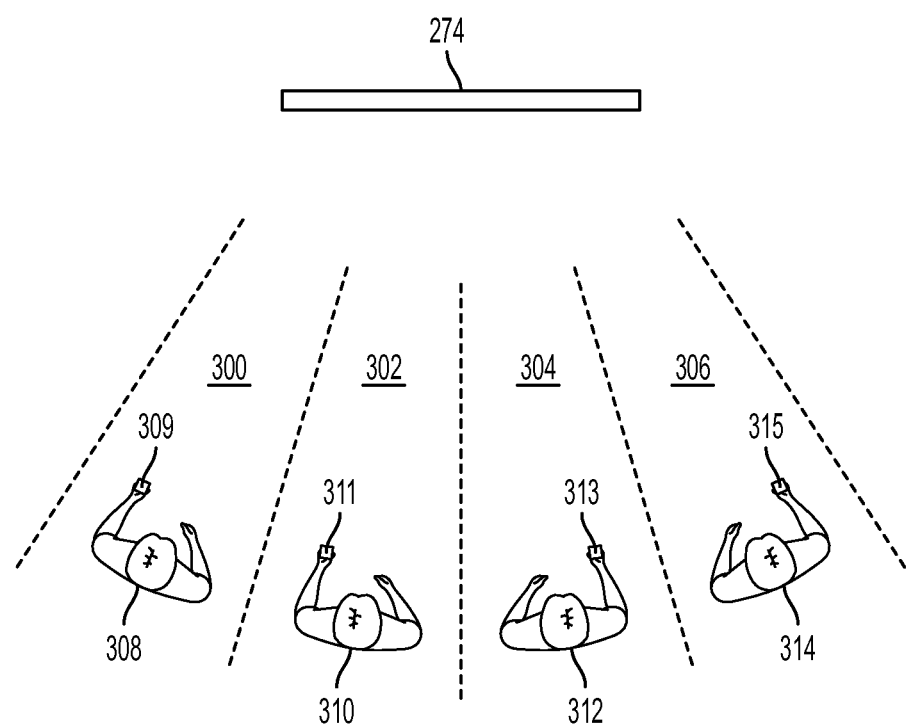
FIG. 15 illustrates an overhead view of an interactive environment for providing input to an interactive program is shown, in accordance with an embodiment of the invention.

With reference to FIG. 15, an overhead view of an interactive environment for providing input to an interactive program is shown, in accordance with an embodiment of the invention. An interactive program is displayed on display 274. Each of the zones 300, 302, 304, and 306 defines a spatial region for which the thermal feedback of a controller is determined when the controller is located within that particular zone. In the embodiment shown, four users 308, 310, 312, and 314 are shown holding controllers 309, 311, 313, and 315 respectively. The users 308, 310, 312, and 314 are shown located in zones 300, 302, 304, and 306, respectively. The zones are approximately radially arranged about the display 274.

In one embodiment, each of the zones 300, 302, 304, and 306 functions as a designated zone for each of the controllers 309, 311, 313, and 315, respectively, and by extension, the associated users of the controllers. By implementing designated spatial zones for each of the users, it is possible to help prevent users from blocking or interfering with each other. For example, if user 354 maneuvers his controller 355 out of his designated zone 346, and into either of the adjacent zones 344 or 348, then the interactive program may communicate to the controller 355 to activate a thermal feedback mechanism, thereby informing the user 354 that his controller 355 is not in its designated zone. In this manner, it is possible to promote order in the positioning of the multiple users of the interactive program.

Figure 16:
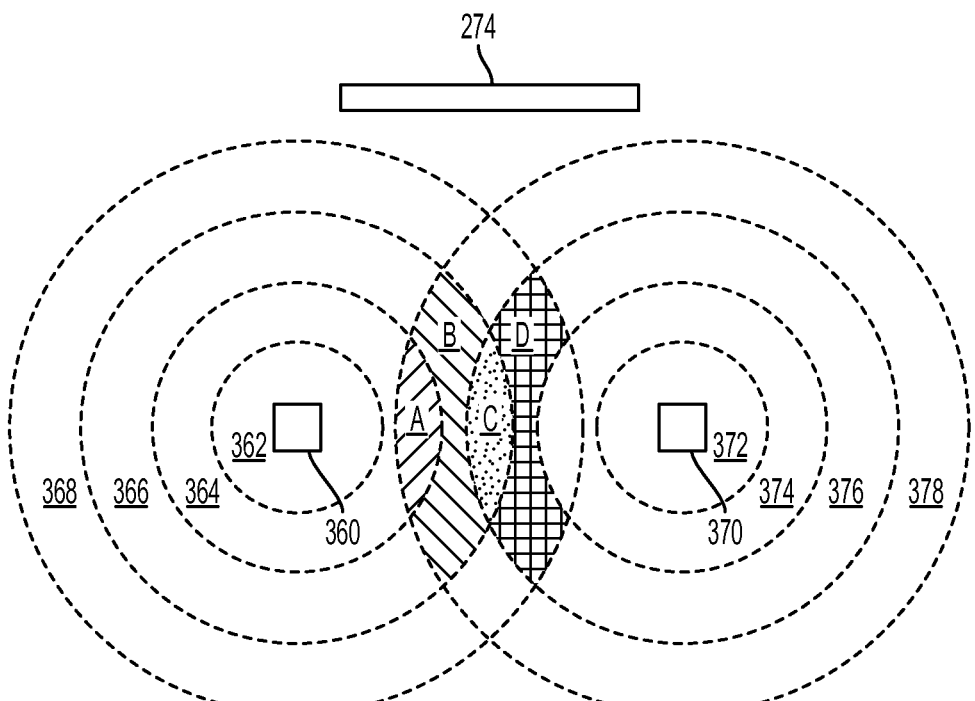
FIG. 16, an overhead view of an interactive environment for providing input to an interactive program is shown, in accordance with an embodiment of the invention.

With reference to FIG. 16, an overhead view of an interactive environment for providing input to an interactive program is shown, in accordance with an embodiment of the invention. An interactive program is displayed on display 274. A controller 360 has corresponding zones 362, 364, 366, and 368. Each of the zones defines a spatial region for which the activation of a thermal feedback mechanism of a controller is determined when the controller is located within that particular zone. As shown, the zones 362, 364, 366, and 368 are arranged in a concentric fashion, so that as the controller 360 is moved outward from its corresponding center-most zone 362, it will pass through zones 364, 366, and 368 in that order. Similarly, a second controller 370 has corresponding zones 372, 374, 376, 378. The zones 372, 374, 376, and 378 are also arranged in a concentric fashion. As shown by regions A, B, C, and D, the concentric zones corresponding to the two controllers 360 and 370 intersect one another in various ways. Region A illustrates the intersection of zone 364 which corresponds to controller 360, and zone 378 which corresponds to controller 370. Region B illustrates the intersection of zone 366 which corresponds to controller 360, and zone 378 which corresponds to controller 370. Region C illustrates the intersection of zone 366 (controller 360) and zone 376 (controller 370). Region D illustrates the intersection of zone 368 (controller 360) and zone 376 (controller 370). Thus, the same spatial location may correspond to one zone for one controller and a different zone for the other controller.

While the presently illustrated example has been described with reference to two controllers having overlapping zones, in other embodiments, there may be more than two controllers with zones configured in any of various ways. The zones may be identical for each controller, or different in accordance with the thermal feedback functionality to be affected by the zones for each particular controller. For example, in a multiplayer game, each player may have different roles or have customizable options such as character types, weapons, etc. These variable aspects of a multi-player game may utilize a different set of zones for affecting the functionality of thermal feedback on each controller. Thus, each player may have a different set of zones assigned to their controller device. These zones may overlap in various ways depending on the location of the zones for each controller device.

Figure 17:
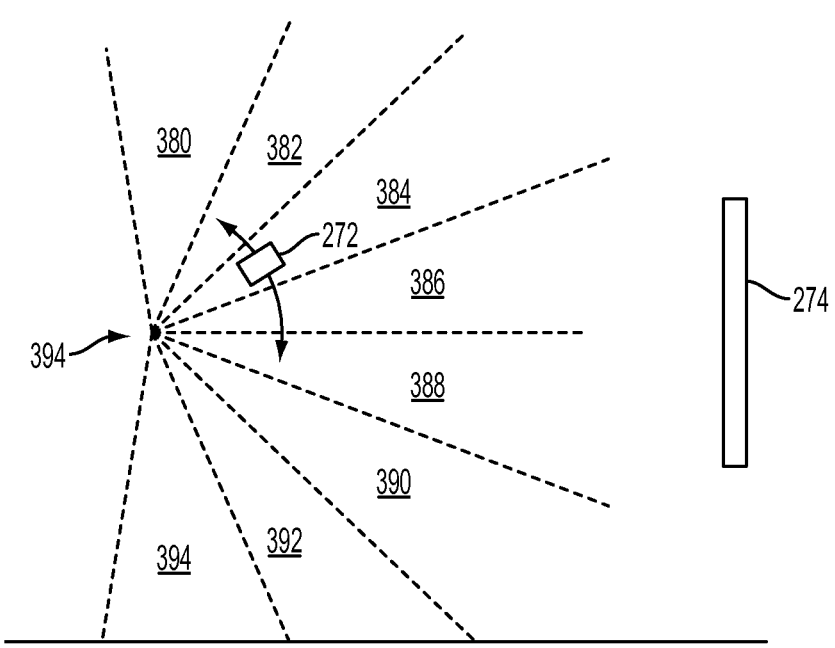
FIG. 17, a side view of an interactive environment for providing input to an interactive program is shown, in accordance with an embodiment of the invention.

With reference to FIG. 17, a side view of an interactive environment for providing input to an interactive program is shown, in accordance with an embodiment of the invention. An interactive program is displayed on display 106. Each of the zones 380, 382, 383, 384, 386, 388, 390, and 392 defines a spatial region for which the activation of a thermal feedback mechanism of a controller 272 is determined when the controller is located within that particular zone. As shown, the zones are arranged in a radial fashion about a location 394, so that a user holding the controller 272 towards the display 106 can maneuver the controller 272 through the various zones by swinging it up and down. As the user so maneuvers the controller 272, the controller will generally follow an arc which causes the controller to pass through the zones. In one embodiment, movement of the controller 100 in an upwards direction, from zone 394, through zones 392, 390, 388, 386, 384, 382, to 380, causes an increase in a level of heating or cooling of the controller 272 with each transition to the next zone. Movement in the opposite direction causes a decrease in the level of heating or cooling of the controller 272. In other embodiments of the invention, the zones may be grouped in various ways. For example, when the controller 272 is in any of zones 380, 382, 384 and 386, then the controller 272 provides heated thermal feedback to a level depending on which of the zones 380, 382, 384 or 386 in which the controller 100 is located. Whereas, when the controller is in any of zones 388, 390, 392, or 394, then the controller 272 provides cooling feedback to a level depending on which of the zones 388, 390, 392, or 394 in which the controller is located. In other embodiments, the zones may be grouped in any manner as is appropriate for the interactive program.

It will be apparent to those skilled in the art that the herein described principles for providing thermal feedback at a controller may be applied to a any number of various interactive programming scenarios. Merely by way of example, and not by way of limitation, several illustrative embodiments are presented.

For example, in one embodiment, the user controls the movement of a character within a virtual environment of a video game. When the character enters a cold environment, the controller exhibits cold feedback, whereas when the character enters a hot environment, the controller exhibits heated feedback. And when the character enters an especially damaging or dangerous environment, the controller may exhibit a thermal grill illusion.

In one embodiment, the user controls a character's hand in a video game by maneuvering a controller. When the character's hand is extended towards or into a cold environment, such as submerging it in cool water, then controller exhibits cold feedback. Whereas when the character's hand is extended towards or into a hot environment, such as towards a fire, then the controller exhibits heated feedback.

In one embodiment, the user maneuvers a motion controller to control the movement of an object in the video game. As the user maneuvers the object and strikes other objects or otherwise interacts with other objects, the controller provides thermal feedback. For example, a user may control a sword in a swordfight by swinging the motion controller. As the sword controlled by the user strikes the opponent's sword repeatedly, the user's controller gradually increases a level of heat feedback. Or in another embodiment, the user swings a racquet, bat, or club to strike a ball. If the ball is not struck correctly, then the controller exhibits a thermal grill illusion.

In one embodiment, a user controls the firing of a weapon in a video game. As the weapon is repeatedly fired, the weapon may heat up and the controller may exhibit increasing heat feedback to communicate this fact to the user. At a certain point, the weapon may become inoperable, and the user must then wait for the weapon to cool off before firing the weapon again. This can likewise be indicated to the user by reducing the level of heat feedback or actively cooling the controller. It will also be noted that the controller may exhibit lighted feedback in conjunction with the thermal feedback. For example, as the weapon heats up, the controller light may change from a cooler color to a warmer color, such as from blue or green to orange or red. Similarly, when the weapon cools down, the color exhibited may revert to the cooler color.

In one embodiment, a user may charge an item in a video game before discharging it. The charging of the item can be correlated with thermal feedback, such as heating or cooling the controller as the item is being charged, and reversing the heating or cooling when the item has been discharged.

In one embodiment, the user may control a character engaged in a battle. When the character is hit by enemy fire or an explosion or other damaging-causing incident, the controller may exhibit a thermal grill illusion. In one embodiment, a thermal grill illusion is provided at the controller when the user's character receives an electric shock.

In some video games, as a user controls a character to destroy a high number of enemies within a certain period of time, the character may gain energy for a special attack. The charging of this special attack may be indicated via thermal feedback at the controller, such as by heating a surface of the controller. Similarly, an illuminated portion of the controller may change in intensity or color to simultaneously indicate the charging of the special attack.

In one embodiment, a user utilizes a controller to discover the presence of objects that are not visible on screen or otherwise known to the user. The user maneuvers the controller about his or her interactive environment, and receives thermal feedback, such as heating or cooling, indicating the presence of an object.

Additionally, the aforementioned embodiments and principles for providing thermal feedback may be utilized in conjunction with biometric data to provide enhanced user interface capabilities. In one embodiment, a controller includes mechanisms for providing thermal feedback as detailed above, and also includes mechanisms for detecting biometric data of a user. Examples of biometric sensors utilized in an interface device are described in U.S. patent application Ser. No. 12/963,594, entitled "BIOMETRIC INTERFACE FOR A HANDHELD DEVICE," filed Dec. 8, 2010, by inventor George Weising, the disclosure of which is herein incorporated by reference. In various embodiments, the thermal feedback and biometric sensors may be utilized in various configurations.

For example, in one embodiment, an interactive application monitors various biometric data received from biometric sensors on a controller device, and initiates thermal feedback on the controller based on the biometric data. The type of thermal feedback provided in relation to the biometric data may vary. For example, in one embodiment, when the interactive application detects a decrease in galvanic skin resistance (GSR), possibly indicating that the user's hands are sweating, then the interactive application could initiate a cooling feedback at the controller. Or conversely, if the GSR increases, then the interactive application could initiate a heating feedback. In a similar fashion, cooling or heating feedback might be initiated based on electrocardio or electromuscular data (e.g. providing cooling feedback when heart rate or electro-muscular activity is increased, these indicating increased stress in the user).

In other embodiments, the thermal feedback initiated at the controller by the interactive application may be affected by biometric data detected from biometric sensors on the controller. For example, in one embodiment, the magnitude of the thermal feedback initiated by the interactive application may be related to the relative stress level of the user as determined based on biometric indicators such as GSR, electrocardio data, and electro-muscular data. For a user exhibiting a low stress level, the interactive application could initiate a lower magnitude of thermal feedback, as the low-stress user may only require a fairly limited magnitude of thermal feedback to appreciate the sensation. Whereas for a user exhibiting a high stress level, the interactive application could initiate a higher magnitude of thermal feedback, as the high-stress user may not appreciate the sensation of thermal feedback unless there is sufficient magnitude to be noticeable despite the user's high-stress state.

In still other embodiments, the interactive application may gauge the effectiveness of providing thermal feedback based on biometric data. The interactive application could monitor the relative stress level of the user as thermal feedback is provided, and determine whether or not the magnitude of thermal feedback should be increased, decreased, or is appropriate. For example, a thermal grill illusion may be initiated, and resulting changes in the stress level of the user as determined based on biometric data could be utilized to determine whether the level of the thermal grill illusion should be increased or decreased in order to achieve a desired stress level. The increase or decreased level could be used for subsequent initiations of the thermal grill illusion.

The foregoing examples utilizing thermal feedback in conjunction with biometric data are provided merely by way of example and not by way of limitation. In other embodiments, an interactive application may be configured to apply thermal feedback based on monitored biometric data in any of various possible configurations. Initiation and cut-off times, levels of magnitude, rates of increase or decrease, or any of a variety of other parameters for thermal feedback may be adjusted in any manner based on biometric data.

In another embodiment, the controller may include a temperature sensor for detecting ambient temperature. The heating and cooling of the controller could be controlled in relation to the ambient temperature. For example, the controller surface might be heated when the ambient temperature is cold, and cooled when the ambient temperature is hot, so as to provide a more comfortable experience to the user holding the controller.

In another embodiment, the controller may include a temperature sensor for measuring the temperature of the user's hand as it holds the controller. When the user's hand is cold, then the controller surface may be heated, whereas when the user's hand is hot, then the controller surface may be cooled.

In still another embodiment, the controller may include one or more fans that operate in conjunction with thermoelectric devices as herein described. The fan(s) may be configured to blow air that has been heated or cooled by a thermoelectric device towards the skin of a user. In one embodiment, when heated air generated on one side of a thermoelectric device is blown towards the skin of the user, then cooled air generated on the opposite side of the thermoelectric device is exhausted from the controller. And conversely, when cooled air generated on one side of a thermoelectric device is blown towards the skin of the user, then heated air generated on the opposite side is exhausted.

While embodiments of the invention as herein presented have generally been described with reference to a motion controller, it will be apparent to those skilled in the art that the principles of the present invention may be applied to any of various types of controllers, including various kinds of game controllers, keyboards, mouse devices, etc. For example, in one embodiment, a keyboard may be configured to blow heated or cooled air towards the hands of a user operating the keyboard.

Figure 18:
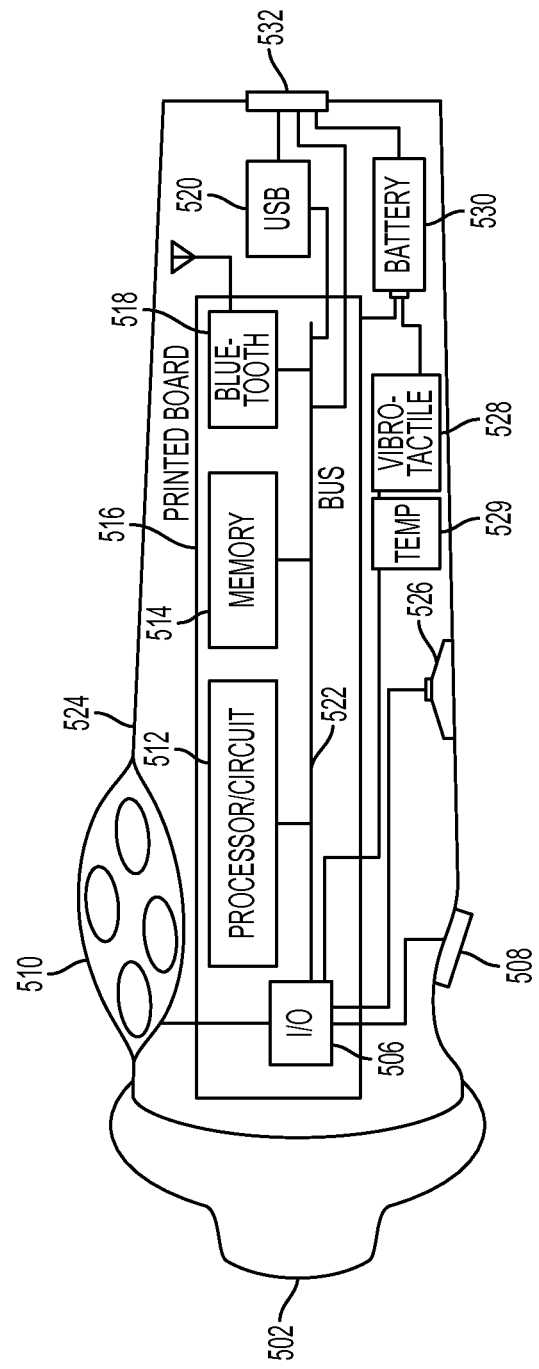
FIG. 18 illustrates the components of a handle of a controller with an expansion connector, in accordance with an embodiment of the invention.

It will be apparent that a controller as herein described may have various forms and features. In one embodiment, a controller may consist of a handle and a separate attachment which provides expanded capabilities. FIG. 18 illustrates the components of a handle 524 of a controller with expansion connector 502, in accordance with an embodiment of the invention. Although controllers defined within the spirit and scope of the claims may have more or less components, these exemplary components show example electronics, hardware, firmware, and housing structure to define an operable example. These example components, however, should not limit the claimed inventions, as more or fewer components are possible. Handle 524 is configured to be held by a user operating the controller with a single hand. A user's second hand may, of course, be used to hold or select buttons on handle 524. A user holding the controller can provide input by pressing buttons, such as top button 510 and bottom button 508. In one embodiment input can also be provided by moving the controller within a three-dimensional space when an attachment is coupled to handle 524, such as the one shown in FIG. 20A. The controller is configured to operate wirelessly, which facilitates freedom of controller movement in order to interact with a computer or console. Wireless communication can be achieved in multiple ways, such as via Bluetooth® wireless link, WiFi, infrared (not shown) link, etc.

Attachments providing expanded capabilities to handle 524 are connected and disconnected to expansion connector 502. In one embodiment, an attachment enables the base computing device to locate the combination of handle and attachment within a three-dimensional space via visual recognition of images taken by a camera. Other embodiments provide additional communication capabilities to the controller, such as an attachment that provides ultrasonic communication with the base computer or with other controllers in the field of play. In yet another embodiment, an attachment provides infrared capabilities to allow the controller to communicate via infrared frequencies with the base computer, or to use the controller as a remote control for a TV or other electronic equipment.

In one embodiment, the attachment communicates directly with the computer and can act upon commands received from the computer, such as turning on an internal light or emitting a sound. In another embodiment, the attachment is directly controlled by handle 524 and the attachment only reacts to commands from handle 524. In yet another embodiment, the attachment can react to commands received from the computer or from the handle.

Inside handle 524, printed circuit board 516 holds processor 512, Input/Output (I/O) module 506, memory 516, and Bluetooth module 518, all interconnected by bus 522. A Universal Serial Bus (USB) module 520 also provides interactivity with the base computing device, or with other devices connected to USB port 532. The USB port can also be used to charge the rechargeable battery 530. Vibrotactile feedback is provided by vibrotactile module 528, and thermal feedback is provided by temperature module 529. Speaker 526 provides audio output.

Note that the above controller configuration is exemplary and many modifications thereto, including eliminating or adding modules, would occur to a person of ordinary skill in the art with access to the present Specification, and is well within the scope of the claimed invention. For example, the controller can also include sensors for mechanical tracking of the controller movement.

Figure 19:
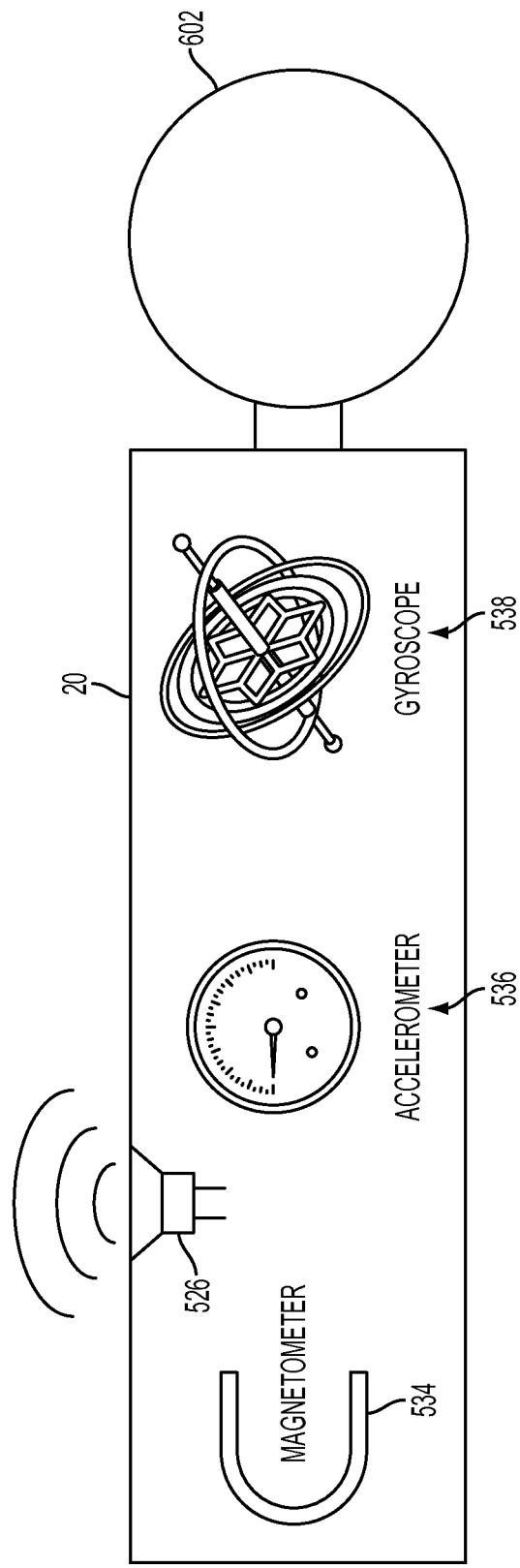
FIG. 19 depicts a controller with sensors for improving movement tracking, according to one embodiment.

FIG. 19 depicts a controller 20 with sensors for improving movement tracking, according to one embodiment. Different embodiments include different combinations of sensors, such as magnetometers 534, accelerometers 536, gyroscopes 538, etc. An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 536 are used to provide the direction of gravity, which gives an absolute reference for 2 angles (world-space pitch and world-space roll). Controllers can suffer accelerations exceeding 5 g, therefore accelerometers able to operate with forces exceeding 5 g are used inside controller 100.

A magnetometer measures the strength and direction of the magnetic field in the vicinity of the controller. In one embodiment, three magnetometers 534 are used within the controller, ensuring an absolute reference for the world-space yaw angle. The magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from the gyros (see below) or the camera. In one embodiment, accelerometer 536 is used together with magnetometer 534 to obtain the inclination and azimuth of the controller.

A gyroscope is a device for measuring or maintaining orientation, based on the principles of angular momentum. In one embodiment, three gyroscopes provide information about movement across the respective axis (x, y and z) based on inertial sensing. The gyroscopes help in detecting fast rotations. However, the gyroscopes can drift overtime without the existence of an absolute reference. This requires, resetting the gyroscopes periodically, which can be done using other available information, such as positional/orientation determination based on visual tracking of the display 106, accelerometer, magnetometer, etc. A hand-held device can rotate faster than 500 degrees/sec, so a gyroscope with a spec of more than 1000 degrees/sec is recommended, but smaller values are also possible.

Figure 20A:
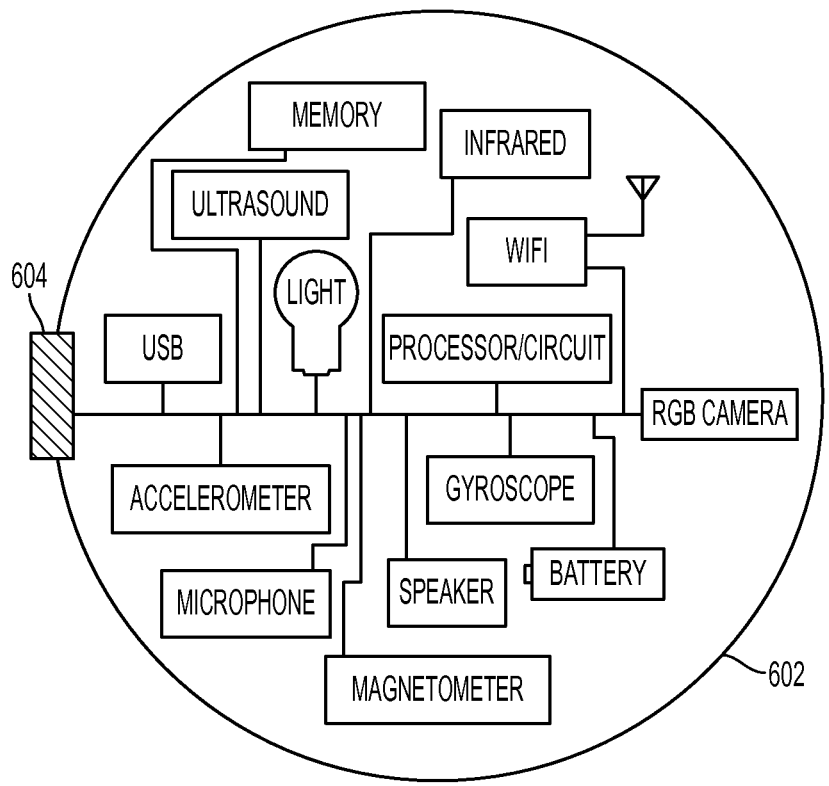
FIG. 20A depicts an attachment for a handle with a "rich" feature set, in accordance with an embodiment of the invention.

FIG. 20A depicts an attachment 602 for the handle 524 with a "rich" feature set. It should be appreciated that the embodiment illustrated in FIG. 20A is exemplary and other embodiments may include a subset of the features of attachment 602. The embodiment illustrated in FIG. 20A should therefore not be interpreted to be exclusive or limiting, but rather exemplary or illustrative.

The different modules in spherical attachment 602 are interconnected via a common bus, but other interconnection mechanisms are possible. Connector 604 provides the interface to connect or disconnect attachment 602 from the controller. Attachment 602 includes a processor or circuit plus memory allowing the attachment to process computer instructions. Further, attachment 602 includes communication modules such as ultrasound, infrared, and WiFi. Such communications enable the attachment to communicate with the computer or other electronic devices, which is referred to herein as a communications interface between the controller and the computer or any other electronic device. In one embodiment, the attachment operates as a modem by receiving information from the controller and forwarding the information to the computer, and vice versa.

Information received by the attachment and passed to the controller is used to change the state of the controller. For example, the controller may emit a sound, change button configuration, disable the controller, load registers in memory, send a command to the attachment to light up, etc. The information received by the computer is used by the interactive program to update the state of the interactive program. For example, the interactive program may move an avatar on the screen or change the status of the avatar, fire a weapon, start a game, select an option in a menu, etc.

An accelerometer, a magnetometer and a gyroscope provide mechanical information related to the movement of the attachment. In one embodiment, the mechanical or inertial information is combined with other location determination information, such as visual tracking of the display, in order to refine the determination of the location of the controller-attachment combo.

An internal light emitting device allows the attachment to be lit from the inside to provide user feedback. In one embodiment, light emitting device can emit light of a single color, and in another embodiment, light emitting device can be configured to emit light from a choice of colors. In yet another embodiment, attachment 602 includes several light emitting devices, each device being capable of emitting light of one color. The light emitting device is configurable to emit different levels of brightness. The computer can provide interactivity to the user holding the controller by changing the light emitting status of attachment 602, producing audio signals, or with vibrotactile feedback, etc. One feedback operation or a combination of feedback operations is possible. In one embodiment, the type of feedback is selected from a list of predefined interactivity, and based on what is occurring in a game.

A microphone and a speaker provide audio capabilities, while a battery powers the rest of the components, including the processor and the light emitting device. The battery can also be used by the handle as a second source of power. For example, if the rechargeable battery in the controller is discharged, the attachment can provide the required power so the user can continue playing instead of having to stop to recharge the controller. In one embodiment, attachment 602 does not include the battery and power to the modules in attachment 602 is obtained via an electrical connection with the power source of the handle.

A USB module allows USB communication to and from the attachment. In one embodiment, the USB connection is used to charge the battery in the attachment. In yet another embodiment, attachment 602 includes files in memory that are transferred to the controller, or to the computer, or to both the controller and the computer. The files in memory can include configuration files or programs that are transferred for execution in the controller or the gaming system. The files can be used to identify a specific user, to configure the controller or the base system, to load a game, to add features to existing games, etc. For example, one file is a game that is loaded to the computer for playing, another file contains karaoke songs that can be used in a sing-along game, another file contains new player rosters and statistics for an update to a sports game, etc. In addition, the attachment can be used to store user parameters, such as player configuration for a particular game. The player can then use the attachment in a different gaming system to play with other players using the configuration obtained from the original gaming system.

Figure 20B:
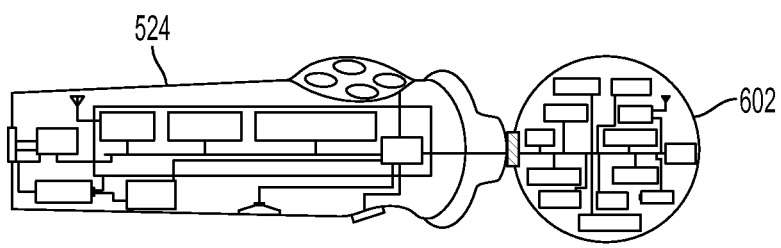
FIG. 20B illustrates an embodiment where the attachment of FIG. 20A is connected to the controller of FIG. 18.

FIG. 20B illustrates an embodiment where the attachment of FIG. 20A is connected to the controller of FIG. 18. In one embodiment, attachment 602 interacts with controller 524 via a communications interface, such as a USB interface. In another embodiment, attachment 602 is in electrical communication with one or several internal modules inside controller 524. For example, processor/circuit of attachment 602 (as seen in FIG. 20A) is connected to bus 522 of controller 524 (as seen in FIG. 18), thus allowing the processor of attachment 602 to communicate with the modules in the controller attached to the bus. The processor of attachment 602 can access memory 516 to write or read data directly, or generate interrupts for processor/circuit 512 of controller 524 to signal an external event which must be processed by processor 512.

It should be noted that the embodiment depicted in FIG. 20B is exemplary and other embodiments may include fewer components.

Furthermore, it will be noted that the attachment 602 may be permanently attached, or configured to be detachable. The attachment 602 can be a shaped object of various configurations. In one embodiment, the shaped object is formed from a piece (or pieces) of plastic. The piece of plastic can be a soft plastic, hard plastic, or of medium hardness. If the shape is defined from a moldable plastic, the shape can be forced into a particular configuration and the shape will stay. In another embodiment, the shape will always bounce back to its original shape if a user squeezes or presses on the shape, during, before, or after using a controller having a shaped object.

In still another embodiment, the shaped object is constructed from a translucent plastic material. The translucent plastic material is configured so that any light generated within the shaped object will light up the shape. The light generated within the shaped object can be produced by any type of light generating device. In one embodiment the device is a light emitting diode. For any of the shaped objects described above and described in the following diagrams, the shaped object can be constructed from the translucent plastic material. The translucent plastic material can be defined by injection molding, or other suitable construction techniques. In other embodiments, the shaped object can be produced from a metallic material, such as aluminum or other metals. Still further, the shaped object can be defined from glass type materials, ceramics, or the like.

In one embodiment, a hand strap is coupled to the controller handle to provide a location for fingers of the user to be held beside the controller handle. For instance, if the user loses his or her grip on the controller body, the integrated hand strap will secure the controller to the users hand. In one embodiment, the integrated hand strap can be defined from a plastic material. The plastic material can be pliable, such as a rubberized or foam type material. In another embodiment, the integrated hand strap can be made from a cloth material, a polyester material, or a threaded material. In still another embodiment, the integrated hand strap can be made from a hard plastic material similar to that of the controller handle, if the controller handle is made from a hard plastic material. Buttons are provided on the controller handle at a location that provides ease of access to a user when interfacing with the controller device. For instance, the controller buttons can include typical gaming-type buttons to allow press operations, trigger operations, joystick operations, and the like.

As described above, the grip can be defined from any number of materials that will provide softness, pliability, and comfort for users that utilize the controller. The controller will also include buttons on at least one side. Additionally, the controller can include a trigger button on at least one side. The gripping material can be provided by applying a layer over the controller body or can be defined integrally with the controller body. At one and of the controller body, the shaped location is defined. The shaped location is generically illustrated to emphasize that any shape of the shaped object can be provided and integrated with the controller. The shape of the controller and of the shaped object will thus take on the form most suitable to the desired configuration, and thus design that is most pleasing to the designer.

The gripping material can be applied to the controller handle or can be integral with the controller handle. The gripping material and the controller handle can have a contoured shape to allow users to hold more comfortably the controller body. In one embodiment, the controller handle can include no buttons whatsoever. In another embodiment, the controller handle can include a plurality of buttons and can be disposed at locations on the controller handle that are most efficient for user access. The shaped location can thus be connected to an end of the controller handle.

Figure 21:
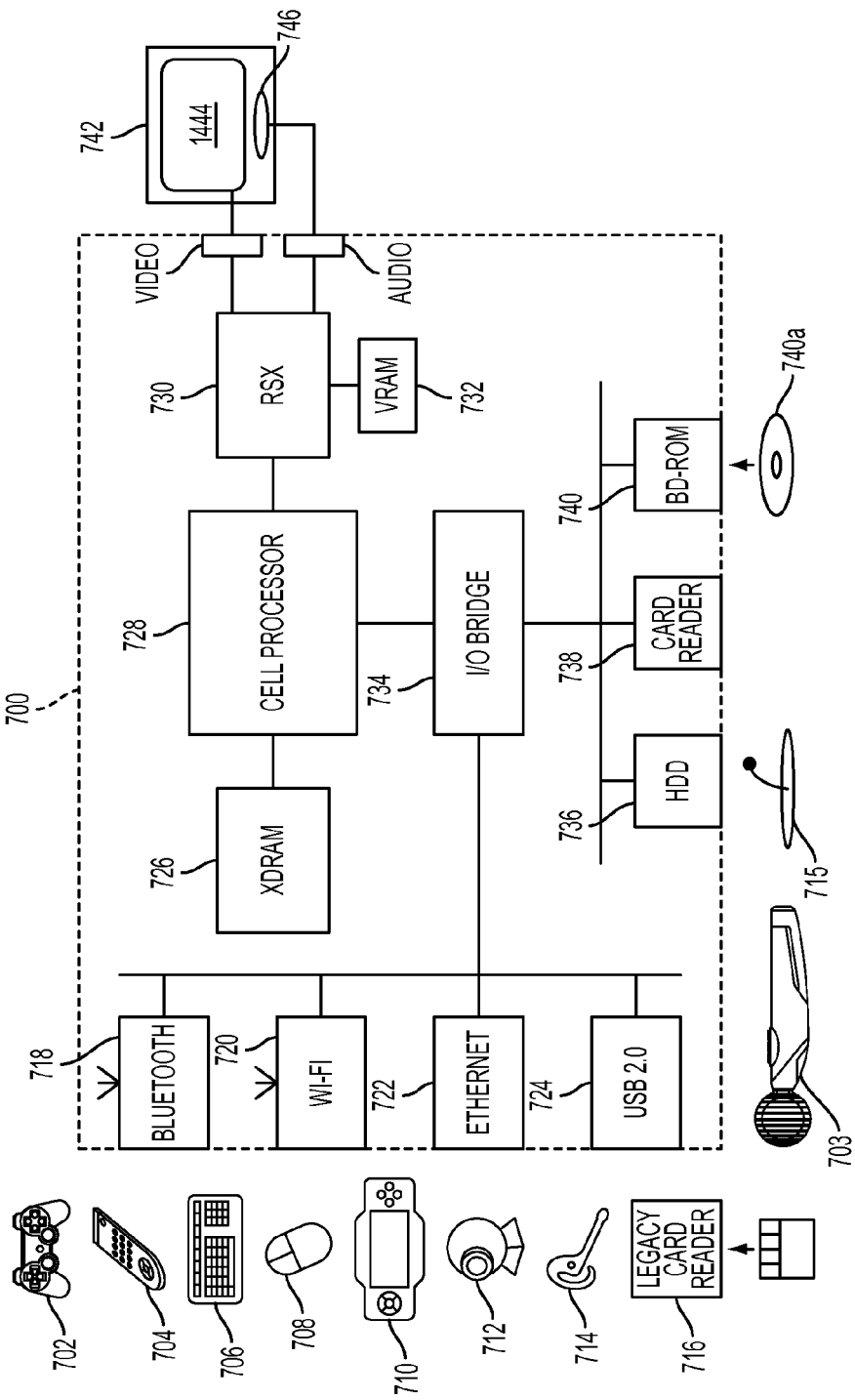
FIG. 21 illustrates hardware and user interfaces that may be used to provide temperature feedback, in accordance with one embodiment of the present invention.

FIG. 21 illustrates hardware and user interfaces that may be used to provide temperature feedback, in accordance with one embodiment of the present invention. FIG. 21 schematically illustrates the overall system architecture of the Sony® Playstation 3® entertainment device, a console that may be compatible for interfacing a control device with a computer program executing at a base computing device in accordance with embodiments of the present invention. A system unit 700 is provided, with various peripheral devices connectable to the system unit 700. The system unit 700 comprises: a Cell processor 728; a Rambus® dynamic random access memory (XDRAM) unit 726; a Reality Synthesizer graphics unit 730 with a dedicated video random access memory (VRAM) unit 732; and an I/O bridge 734. The system unit 700 also comprises a Blu Ray® Disk BD-ROM® optical disk reader 740 for reading from a disk 740a and a removable slot-in hard disk drive (HDD) 736, accessible through the I/O bridge 734. Optionally the system unit 700 also comprises a memory card reader 738 for reading compact flash memory cards, Memory Stick® memory cards and the like, which is similarly accessible through the I/O bridge 734.

The I/O bridge 734 also connects to six Universal Serial Bus (USB) 2.0 ports 724; a gigabit Ethernet port 722; an IEEE 802.11b/g wireless network (Wi-Fi) port 720; and a Bluetooth® wireless link port 718 capable of supporting up to seven Bluetooth connections.

In operation, the I/O bridge 734 handles all wireless, USB and Ethernet data, including data from one or more game controllers 702-703. For example when a user is playing a game, the I/O bridge 734 receives data from the game controller 702-703 via a Bluetooth link and directs it to the Cell processor 728, which updates the current state of the game accordingly.

The wireless, USB and Ethernet ports also provide connectivity for other peripheral devices in addition to game controllers 702-703, such as: a remote control 704; a keyboard 706; a mouse 708; a portable entertainment device 710 such as a Sony Playstation Portable® entertainment device; a video camera such as an EyeToy® video camera 712; a microphone headset 714; and a microphone 715. Such peripheral devices may therefore in principle be connected to the system unit 700 wirelessly; for example the portable entertainment device 710 may communicate via a Wi-Fi ad-hoc connection, whilst the microphone headset 714 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 716 may be connected to the system unit via a USB port 724, enabling the reading of memory cards 748 of the kind used by the Playstation® or Playstation 2® devices.

The game controllers 702-703 are operable to communicate wirelessly with the system unit 700 via the Bluetooth link, or to be connected to a USB port, thereby also providing power by which to charge the battery of the game controllers 702-703. Game controllers 702-703 can also include memory, a processor, a memory card reader, permanent memory such as flash memory, light emitters such as an illuminated spherical section, LEDs, or infrared lights, microphone and speaker for ultrasound communications, an acoustic chamber, a digital camera, an internal clock, a recognizable shape such as the spherical section facing the game console, and wireless communications using protocols such as Bluetooth®, WiFi™, etc.

Game controller 702 is a controller designed to be used with two hands, and game controller 703 is a single-hand controller with an attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 704 is also operable to communicate wirelessly with the system unit 700 via a Bluetooth link. The remote control 704 comprises controls suitable for the operation of the Blu Ray™ Disk BD-ROM reader 540 and for the navigation of disk content.

The Blu Ray™ Disk BD-ROM reader 740 is operable to read CD-ROMs compatible with the Playstation and PlayStation 2 devices, in addition to conventional pre-recorded and recordable CDs, and so-called Super Audio CDs. The reader 740 is also operable to read DVD-ROMs compatible with the Playstation 2 and PlayStation 3 devices, in addition to conventional pre-recorded and recordable DVDs. The reader 740 is further operable to read BD-ROMs compatible with the Playstation 3 device, as well as conventional pre-recorded and recordable Blu-Ray Disks.

The system unit 700 is operable to supply audio and video, either generated or decoded by the Playstation 3 device via the Reality Synthesizer graphics unit 730, through audio and video connectors to a display and sound output device 742 such as a monitor or television set having a display 744 and one or more loudspeakers 746. The audio connectors 750 may include conventional analogue and digital outputs whilst the video connectors 752 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 728. The Playstation 3 device's operating system supports Dolby® 5.1 surround sound, Dolby® Theatre Surround (DTS), and the decoding of 7.1 surround sound from Blu-Ray® disks.

In the present embodiment, the video camera 712 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 700. The camera LED indicator is arranged to illuminate in response to appropriate control data from the system unit 700, for example to signify adverse lighting conditions. Embodiments of the video camera 712 may variously connect to the system unit 700 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 700, an appropriate piece of software such as a device driver should be provided. Device driver technology is well-known and will not be described in detail here, except to say that the skilled man will be aware that a device driver or similar software interface may be required in the present embodiment described.

Figure 22:
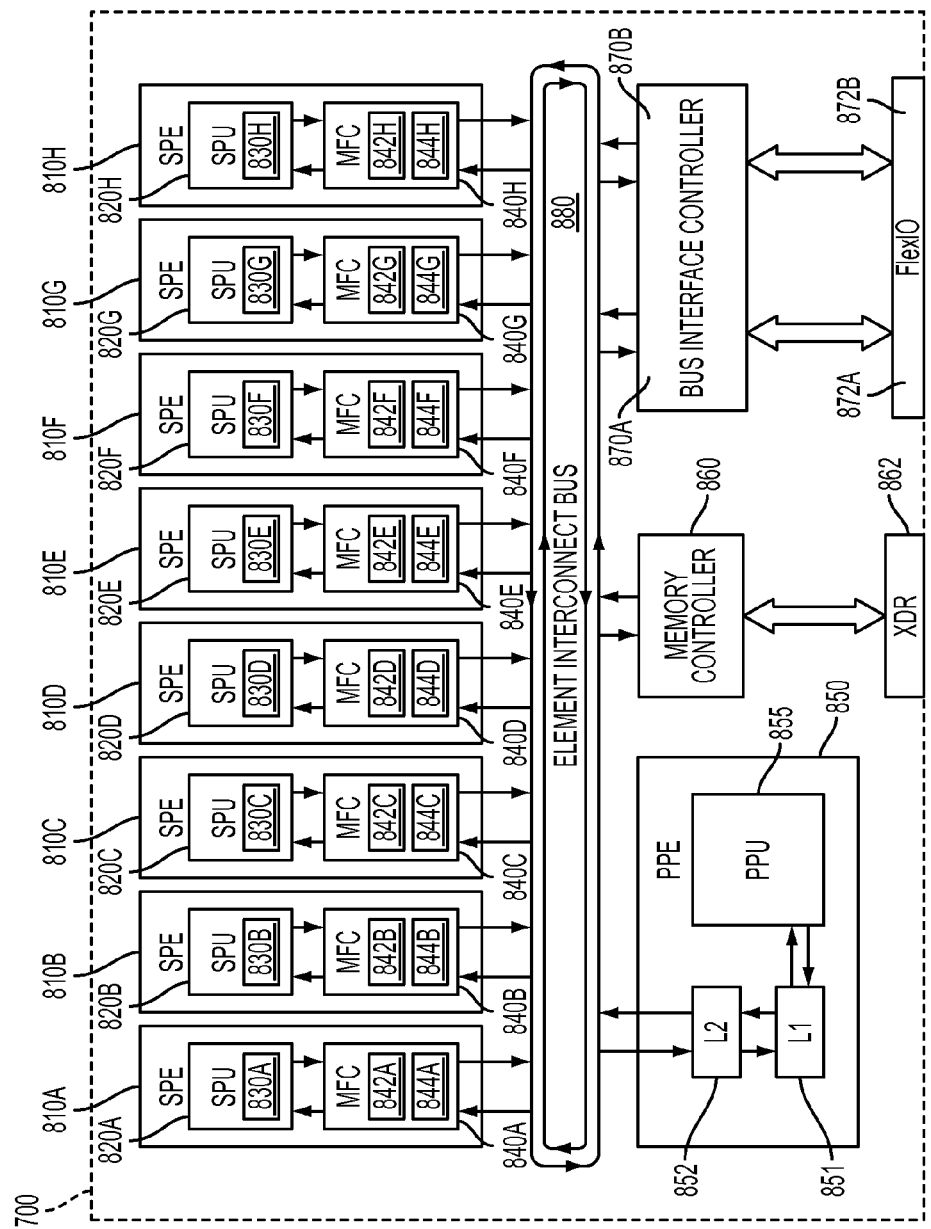
FIG. 22 illustrates additional hardware that may be used to process instructions, in accordance with one embodiment of the present invention.

FIG. 22 illustrates additional hardware that may be used to process instructions, in accordance with one embodiment of the present invention. Cell processor 728 has an architecture comprising four basic components: external input and output structures comprising a memory controller 860 and a dual bus interface controller 870A, B; a main processor referred to as the Power Processing Element 850; eight co-processors referred to as Synergistic Processing Elements (SPEs) 810A-H; and a circular data bus connecting the above components referred to as the Element Interconnect Bus 880. The total floating point performance of the Cell processor is 218 GFLOPS, compared with the 6.2 GFLOPs of the Playstation 2 device's Emotion Engine.

The Power Processing Element (PPE) 850 is based upon a two-way simultaneous multithreading Power 570 compliant PowerPC core (PPU) 855 running with an internal clock of 3.2 GHz. It comprises a 512 kB level 2 (L2) cache and a 32 kB level 1 (L1) cache. The PPE 850 is capable of eight single position operations per clock cycle, translating to 25.6 GFLOPs at 3.2 GHz. The primary role of the PPE 850 is to act as a controller for the Synergistic Processing Elements 810A-H, which handle most of the computational workload. In operation the PPE 850 maintains a job queue, scheduling jobs for the Synergistic Processing Elements 810A-H and monitoring their progress. Consequently each Synergistic Processing Element 810A-H runs a kernel whose role is to fetch a job, execute it and synchronized with the PPE 850.

Each Synergistic Processing Element (SPE) 810A-H comprises a respective Synergistic Processing Unit (SPU) 820A-H, and a respective Memory Flow Controller (MFC) 840A-H comprising in turn a respective Dynamic Memory Access Controller (DMAC) 842A-H, a respective Memory Management Unit (MMU) 844A-H and a bus interface (not shown). Each SPU 820A-H is a RISC processor clocked at 3.2 GHz and comprising 256 kB local RAM 830A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 820A-H does not directly access the system memory XDRAM 726; the 64-bit addresses formed by the SPU 820A-H are passed to the MFC 840A-H which instructs its DMA controller 842A-H to access memory via the Element Interconnect Bus 880 and the memory controller 860.

The Element Interconnect Bus (EIB) 880 is a logically circular communication bus internal to the Cell processor 728 which connects the above processor elements, namely the PPE 850, the memory controller 860, the dual bus interface 870A,B and the 8 SPEs 810A-H, totaling 12 participants. Participants can simultaneously read and write to the bus at a rate of 8 bytes per clock cycle. As noted previously, each SPE 810A-H comprises a DMAC 842A-H for scheduling longer read or write sequences. The EIB comprises four channels, two each in clockwise and anti-clockwise directions. Consequently for twelve participants, the longest step-wise dataflow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz.

The memory controller 860 comprises an XDRAM interface 862, developed by Rambus Incorporated. The memory controller interfaces with the Rambus XDRAM 726 with a theoretical peak bandwidth of 25.6 GB/s.

The dual bus interface 870A,B comprises a Rambus FlexIO® system interface 872A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 734 via controller 870A and the Reality Simulator graphics unit 730 via controller 870B.

Data sent by the Cell processor 728 to the Reality Simulator graphics unit 730 will typically comprise display lists, being a sequence of commands to draw vertices, apply textures to polygons, specify lighting conditions, and so on.

Figure 23:
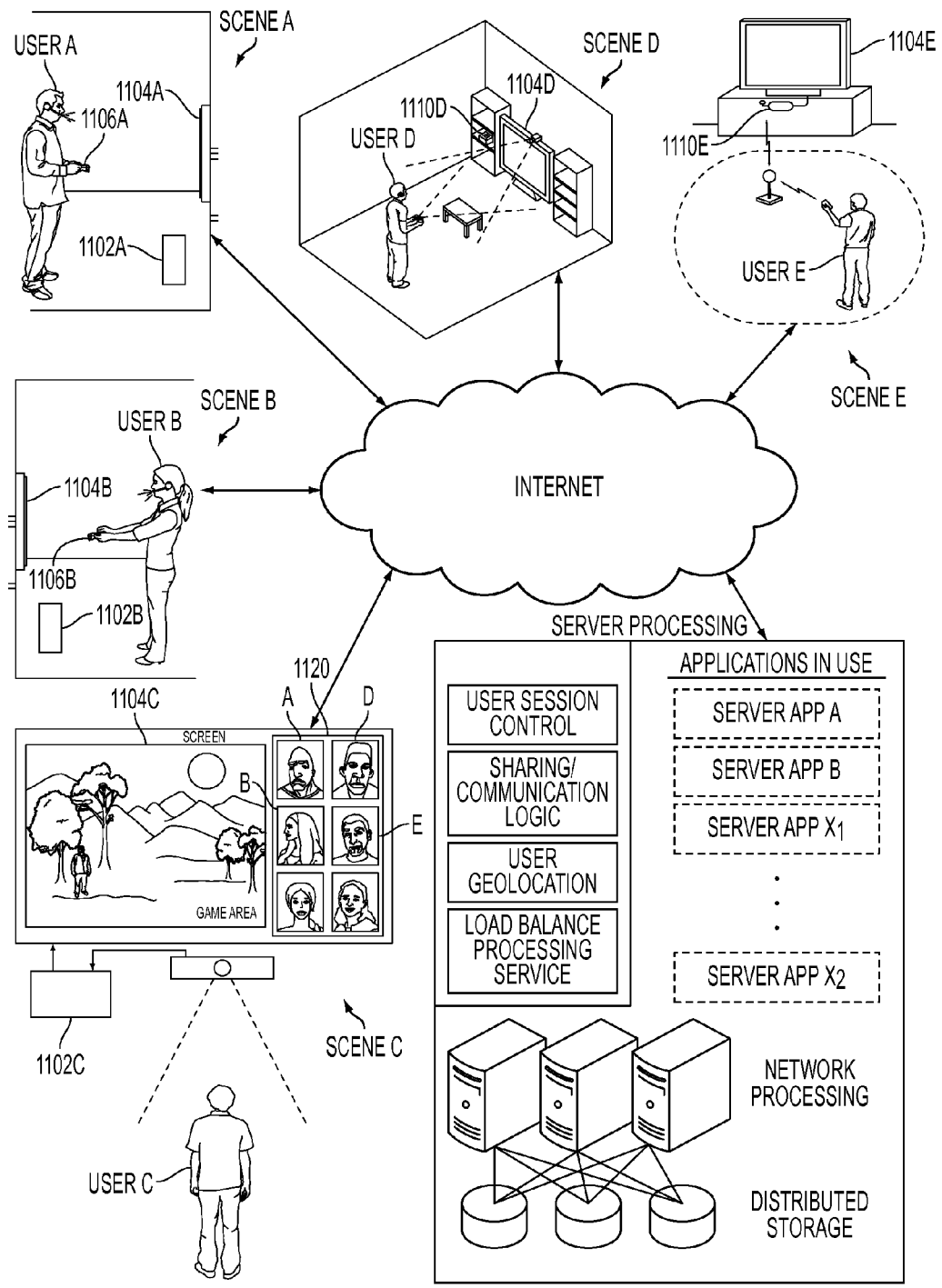
FIG. 23 is an exemplary illustration of scene A through scene E with respective user A through user E interacting with game clients 1102 that are connected to server processing via the internet, in accordance with one embodiment of the present invention.

FIG. 23 is an exemplary illustration of scene A through scene E with respective user A through user E interacting with game clients 1102 that are connected to server processing via the internet, in accordance with one embodiment of the present invention. A game client is a device that allows users to connect to server applications and processing via the internet. The game client allows users to access and playback online entertainment content such as but not limited to games, movies, music and photos. Additionally, the game client can provide access to online communications applications such as VOIP, text chat protocols, and email.

A user interacts with the game client via controller. In some embodiments the controller is a game client specific controller while in other embodiments, the controller can be a keyboard and mouse combination. In one embodiment, the game client is a standalone device capable of outputting audio and video signals to create a multimedia environment through a monitor/television and associated audio equipment. For example, the game client can be, but is not limited to a thin client, an internal PCI-express card, an external PCI-express device, an ExpressCard device, an internal, external, or wireless USB device, or a Firewire device, etc. In other embodiments, the game client is integrated with a television or other multimedia device such as a DVR, Blu-Ray player, DVD player or multi-channel receiver.

Within scene A of FIG. 23, user A interacts with a client application displayed on a monitor 1104A using a controller 1106A paired with game client 1102A. Similarly, within scene B, user B interacts with another client application that is displayed on monitor 1104B using a controller 1106B paired with game client 1102B. Scene C illustrates a view from behind user C as he looks at a monitor displaying a game and buddy list from the game client 1102C. While FIG. 17 shows a single server processing module, in one embodiment, there are multiple server processing modules throughout the world. Each server processing module includes sub-modules for user session control, sharing/communication logic, user geo-location, and load balance processing service. Furthermore, a server processing module includes network processing and distributed storage.

When a game client 1102 connects to a server processing module, user session control may be used to authenticate the user. An authenticated user can have associated virtualized distributed storage and virtualized network processing. Examples items that can be stored as part of a user's virtualized distributed storage include purchased media such as, but not limited to games, videos and music etc. Additionally, distributed storage can be used to save game status for multiple games, customized settings for individual games, and general settings for the game client. In one embodiment, the user geo-location module of the server processing is used to determine the geographic location of a user and their respective game client. The user's geographic location can be used by both the sharing/communication logic and the load balance processing service to optimize performance based on geographic location and processing demands of multiple server processing modules. Virtualizing either or both network processing and network storage would allow processing tasks from game clients to be dynamically shifted to underutilized server processing module(s). Thus, load balancing can be used to minimize latency associated with both recall from storage and with data transmission between server processing modules and game clients.

The server processing module has instances of server application A and server application B. The server processing module is able to support multiple server applications as indicated by server application $X_1$ and server application $X_2$. In one embodiment, server processing is based on cluster computing architecture that allows multiple processors within a cluster to process server applications. In another embodiment, a different type of multi-computer processing scheme is applied to process the server applications. This allows the server processing to be scaled in order to accommodate a larger number of game clients executing multiple client applications and corresponding server applications. Alternatively, server processing can be scaled to accommodate increased computing demands necessitated by more demanding graphics processing or game, video compression, or application complexity. In one embodiment, the server processing module performs the majority of the processing via the server application. This allows relatively expensive components such as graphics processors, RAM, and general processors to be centrally located and reduces to the cost of the game client. Processed server application data is sent back to the corresponding game client via the internet to be displayed on a monitor.

Scene C illustrates an exemplary application that can be executed by the game client and server processing module. For example, in one embodiment game client 1102C allows user C to create and view a buddy list 1120 that includes user A, user B, user D and user E. As shown, in scene C, user C is able to see either real time images or avatars of the respective user on monitor 1104C. Server processing executes the respective applications of game client 1102C and with the respective game clients 1102 of users A, user B, user D and user E. Because the server processing is aware of the applications being executed by game client B, the buddy list for user A can indicate which game user B is playing. Further still, in one embodiment, user A can view actual in game video directly from user B. This is enabled by merely sending processed server application data for user B to game client A in addition to game client B.

In addition to being able to view video from buddies, the communication application can allow real-time communications between buddies. As applied to the previous example, this allows user A to provide encouragement or hints while watching real-time video of user B. In one embodiment two-way real time voice communication is established through a client/server application. In another embodiment, a client/server application enables text chat. In still another embodiment, a client/server application converts speech to text for display on a buddy's screen.

Scene D and scene E illustrate respective user D and user E interacting with game consoles 1110D and 1110E respectively. Each game console 1110D and 1110E are connected to the server processing module and illustrate a network where the server processing modules coordinates game play for both game consoles and game clients.

Figure 24:
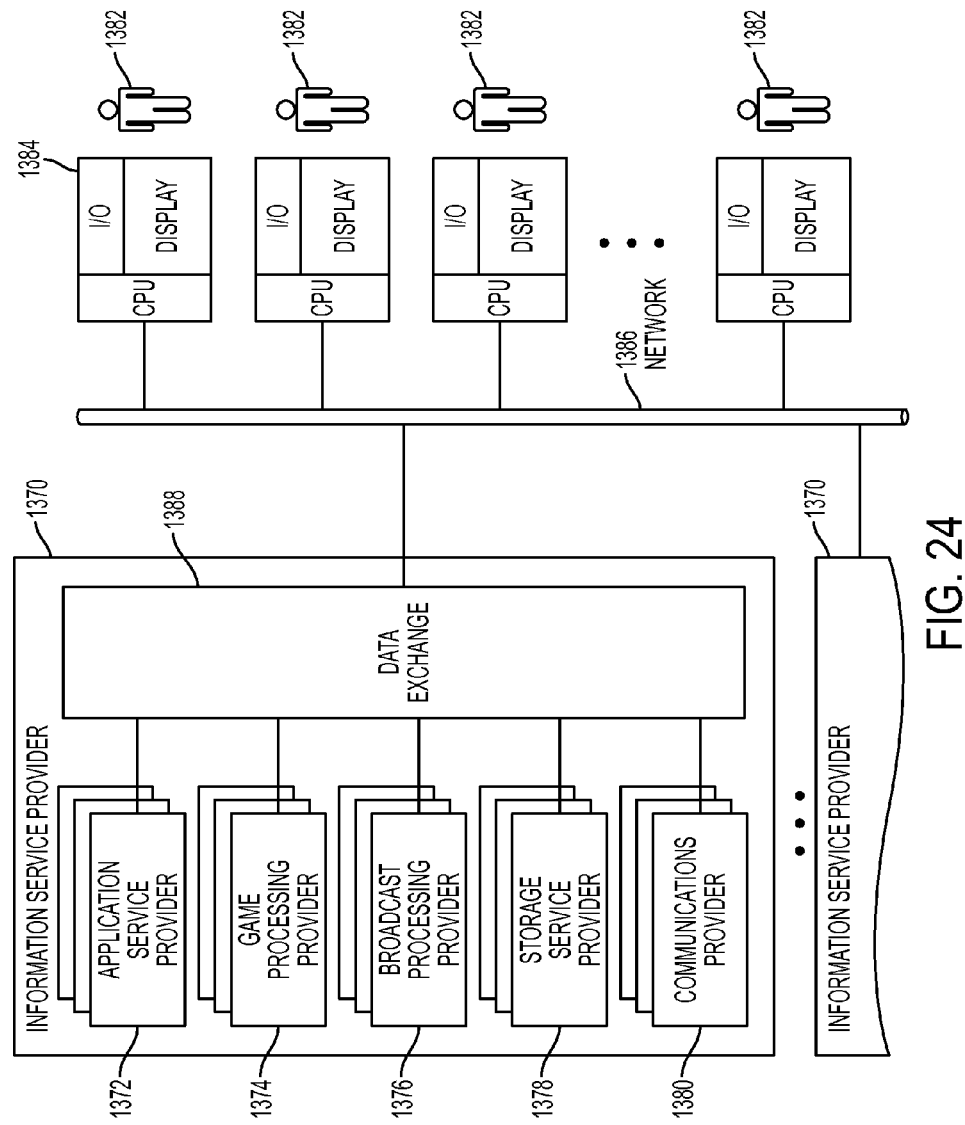
FIG. 24 illustrates an embodiment of an Information Service Provider architecture.

FIG. 24 illustrates an embodiment of an Information Service Provider architecture. Information Service Providers (ISP) 1370 delivers a multitude of information services to users 1382 geographically dispersed and connected via network 1386. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In other embodiment, the data is transferred from one ISP to another ISP as the client moves around the world to make the ISP in better position to service the user be the one that delivers these services.

ISP 1370 includes Application Service Provider (ASP) 1372, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet, based on how the Internet is depicted in computer network diagrams and is an abstraction for the complex infrastructure it conceals.

Further, ISP 1370 includes a Game Processing Server (GPS) 1374 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1376 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1378 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 380 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1388 interconnects the several modules inside ISP 1370 and connects these modules to users 1382 via network 1386. Data Exchange 1388 can cover a small area where all the modules of ISP 1370 are in close proximity, or can cover a large geographic area when the different modules are geographically dispersed. For example, Data Exchange 1388 can include a fast Gigabit Ethernet (or faster) within a cabinet of a data center, or an intercontinental virtual area network (VLAN).

Users 1382 access the remote services with client device 1384, which includes at least a CPU, a display and I/O. The client device can be a PC, a mobile phone, a netbook, a PDA, etc. In one embodiment, ISP 1370 recognizes the type of device used by the client and adjusts the communication method employed. In other cases, client devices use a standard communications method, such as html, to access ISP 1370.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A controller for interfacing with an interactive program, comprising:
    an outer surface, the outer surface including a plurality of first surface regions and one or more second surface regions, the one or more second surface regions arranged in an alternating and adjacent fashion with the plurality of first surface regions;
    at least one heating source coupled to the plurality of first surface regions;
    at least one cooling source coupled to the one or more second surface regions; and
    a thermal controller for determining when to activate the at least one heating source to heat the plurality of first surface regions and when to activate the at least one cooling source to cool the one or more second surface regions, based on thermal trigger data generated by the interactive program;
    wherein the outer surface is defined on a portion of the controller to be contacted by skin of a user when holding the controller;
    wherein simultaneous activation of the at least one heating source and the at least one cooling source produces a thermal grill illusion when the portion of the controller is held by the user.

2. The controller of claim 1, wherein the at least one heating source and the at least one cooling source comprise at least one thermoelectric device.

3. The controller of claim 1, wherein the thermal controller determines a level of activation for the at least one heating source and a level of activation for the at least one cooling source based on the thermal trigger data generated by the interactive program.

4. The controller of claim 1, wherein the outer surface, the at least one heating source, the at least one cooling source, and the thermal controller are defined on a detachable sheath attachment.

5. A controller for interfacing with an interactive program and providing thermal feedback from the interactive program, comprising:
    a first thermoelectric device having a first externally exposed surface that is heated when the first thermoelectric device is activated;
    a second thermoelectric device adjacent to the first thermoelectric device, the second thermoelectric device having a second externally exposed surface that is cooled when the second thermoelectric device is activated;
    a third thermoelectric device adjacent to the second thermoelectric device, the third thermoelectric device having a third externally exposed surface that is heated when the third thermoelectric device is activated; and a thermal controller for determining when to activate the first, second, and third thermoelectric devices based on thermal trigger data generated by the interactive program, the thermal trigger data being defined based on a tracked location of the controller;

wherein the first, second, and third thermoelectric devices are defined on a portion of the controller, the portion oriented to be contacted by skin of a user when holding the controller;

wherein simultaneous activation of the first, second, and third thermoelectric devices produces a thermal grill illusion when the portion of the controller is held by the user.

6. The controller of claim 5, further comprising:

a first insulator defined between the first thermoelectric device and the second thermoelectric device; and a second insulator defined between the second thermoelectric device and the third thermoelectric device.

7. The controller of claim 5, further comprising at least one lamp for radiating colors correlated to the activation of the first, second, or third thermoelectric devices.

8. A method for providing thermal feedback to a user operating a controller, comprising:

receiving thermal trigger data from a computing device executing a video game;

heating a plurality of first surface regions of the controller based on the thermal trigger data;

cooling one or more second surface regions of the controller based on the thermal trigger data, wherein the one or more second surface regions are arranged in an alternating and adjacent fashion with the plurality of first surface regions;

wherein simultaneous heating of the plurality of first surface regions and cooling of the one or more second surface regions produces a thermal grill illusion when skin of the user contacts the plurality of first surface regions and the one or more second surface regions.

9. The method of claim 8, wherein heating the plurality of first surface regions and cooling the one or more second surface regions includes activating at least one thermoelectric device.

10. The method of claim 8, further comprising, tracking a position of the controller;

generating the thermal trigger data based on the tracked position of the controller.

11. The method of claim 8, further comprising, illuminating a lighted portion of the controller, the illumination generating a color based on the thermal trigger data.

12. A method for providing thermal feedback to a user operating a controller, comprising:

executing an interactive application;

tracking a position of the controller;

generating thermal trigger data, the thermal trigger data determining a level of heating and cooling, respectively, for a plurality of alternating and adjacent surface regions of the controller, wherein the thermal trigger data is generated based on the tracked position of the controller;

transmitting the thermal trigger data to the controller;

wherein simultaneous heating and cooling, respectively, of the alternating and adjacent surface regions produces a thermal grill illusion when skin of the user contacts the alternating and adjacent surface regions.

13. The method of claim 5, wherein generating the thermal trigger data includes determining a current location of a virtual object within a virtual environment, the current location being correlated to a predefined thermal feedback configuration.

14. The method of claim 12, further comprising, generating light trigger data based on the thermal trigger data, the light trigger data determining a color to be displayed by a light source of the controller;

transmitting the light trigger data to the controller.

15. The method of claim 12, wherein the thermal trigger data is defined based on a thermal feedback predefined for an identified spatial region in which the position of the controller is tracked.

\* \* \* \* \*